(12) United States Patent
Mori et al.

(10) Patent No.: US 10,073,492 B2
(45) Date of Patent: Sep. 11, 2018

(54) ELECTRONIC DEVICE

(71) Applicant: Panasonic Intellectual Property Management Co., Ltd., Osaka-shi, Osaka (JP)

(72) Inventors: Takeshi Mori, Osaka (JP); Akira Iwamoto, Osaka (JP); Hirofumi Sasaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/629,463

(22) Filed: Jun. 21, 2017

(65) Prior Publication Data

US 2017/0285693 A1  Oct. 5, 2017

Related U.S. Application Data

(63) Continuation of application No. PCT/JP2015/006265, filed on Dec. 16, 2015.

(30) Foreign Application Priority Data

Dec. 26, 2014 (JP) ................................ 2014-265968

(51) Int. Cl.
*G06F 1/16* (2006.01)
*H05K 5/00* (2006.01)
*H05K 7/00* (2006.01)

(52) U.S. Cl.
CPC .......... *G06F 1/1679* (2013.01); *G06F 1/1616* (2013.01); *G06F 1/1637* (2013.01); *G06F 1/1681* (2013.01)

(58) Field of Classification Search
CPC .... G06F 1/1616; G06F 1/1637; G06F 1/1679; G06F 1/1681; G06F 1/1626; G06F 1/1632; G06F 1/1654; G06F 1/1669; G06F 1/1662; G06F 1/1618; E05B 65/0067
USPC .......................... 361/679.27, 679.29, 679.3, 361/679.32–679.39, 679.55, 679.56, 361/679.57, 679.58
See application file for complete search history.

(56) References Cited

U.S. PATENT DOCUMENTS

| | | | | |
|---|---|---|---|---|
| 5,619,397 A | * | 4/1997 | Honda | G06F 1/1632 361/679.43 |
| 6,937,468 B2 | * | 8/2005 | Lin | G06F 1/1632 361/679.41 |
| 8,773,850 B2 | * | 7/2014 | Minaguchi | H04N 5/64 361/679.41 |

(Continued)

FOREIGN PATENT DOCUMENTS

JP  2014-099007  5/2014

*Primary Examiner* — Anthony Haughton
(74) *Attorney, Agent, or Firm* — Hamre, Schumann, Mueller & Larson, P.C.

(57) ABSTRACT

An electronic device of the present disclosure is configured to detachably include a first unit and a second unit. The second unit includes a socket. The socket includes a socket main body, and an operating member for performing a releasing operation of engagement through a lock mechanism that makes the first unit and the second unit detachable. The socket main body includes a first wall and a second wall. The operating member includes a first operating portion disposed on an exterior of the first wall, and a second operating portion disposed on an exterior of the second wall.

3 Claims, 18 Drawing Sheets

(56) References Cited

U.S. PATENT DOCUMENTS

| | | | | |
|---|---|---|---|---|
| 8,873,233 B2* | 10/2014 | Reber | ............... | H04M 1/04 |
| | | | | 361/679.01 |
| 8,922,994 B2* | 12/2014 | Zawacki | ............... | G06F 1/1683 |
| | | | | 292/30 |
| 9,223,344 B2* | 12/2015 | Wang | ............... | G06F 1/1632 |
| 9,256,256 B2* | 2/2016 | Liang | ............... | G06F 1/1632 |
| 9,451,822 B2* | 9/2016 | Gu | ............... | A47B 23/044 |
| 9,575,513 B2* | 2/2017 | Nishioka | ............... | G06F 1/1669 |
| 2004/0246666 A1* | 12/2004 | Maskatia | ............... | G06F 1/1616 |
| | | | | 361/679.57 |
| 2011/0199727 A1* | 8/2011 | Probst | ............... | G06F 1/1628 |
| | | | | 361/679.09 |

\* cited by examiner

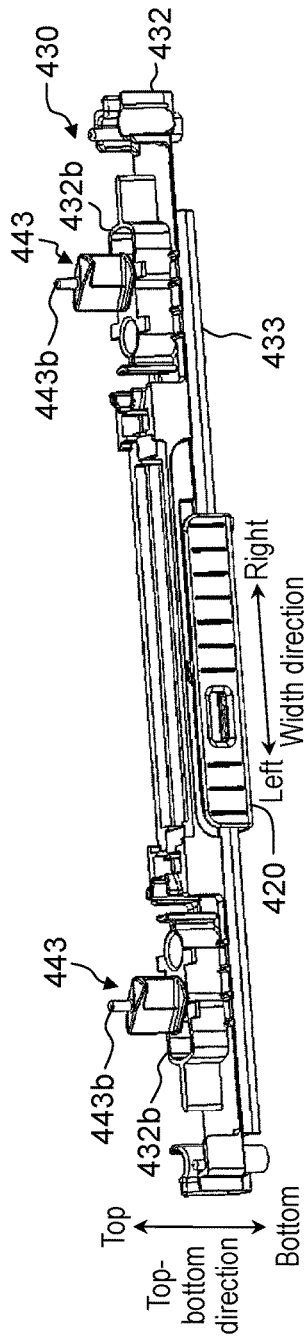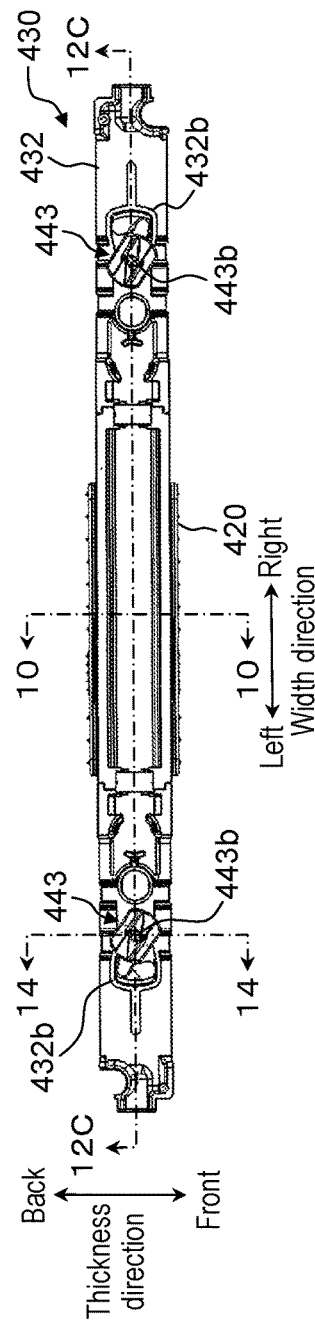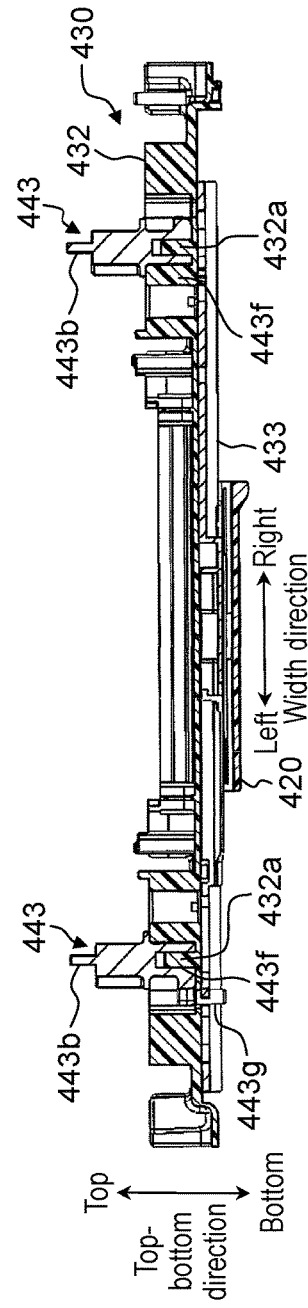

ELECTRONIC DEVICE

BACKGROUND

1. Technical Field

The present disclosure relates to an electronic device configured to include a first unit including a display and a second unit including an input portion so that the first unit and the second unit are detachable.

2. Description of Related Art

Unexamined Japanese Patent Publication No. 2014-99007 has disclosed a structure where a tablet computer (a first unit) and a station (a second unit) including a keyboard are detachable. Specifically, in Unexamined Japanese Patent Publication No. 2014-99007, the station includes an attachment to which the tablet computer can be attached. The attachment includes, at an end in a width direction of the station, an eject knob (an operating member) for performing attachment and removal.

SUMMARY

An electronic device of the present disclosure is an electronic device configured to include a first unit including a display and a second unit including an input portion so that the first unit and the second unit are detachable. The first unit includes a first main face on which a display is disposed, and a second main face approximately parallel to the first main face. The second unit includes an input unit on which the input portion is disposed, a socket capable of accommodating a first side of the first unit, and hinges coupling a second side of the input unit and a third side of the socket so that the input unit and the socket are relatively rotatable.

The socket includes a socket main body, and an operating member for performing a releasing operation of engagement through a lock mechanism for detachably locking the first unit and the second unit.

The socket main body includes a first wall lying in parallel to the first main face in an accommodated state where the first side of the first unit is accommodated in the socket, and a second wall lying in parallel to the second main face in the accommodated state.

The operating member includes a first operating portion disposed on an exterior of the first wall, and a second operating portion disposed on an exterior of the second wall.

According to the present disclosure, the socket includes, in the accommodated state where the first side of the first unit is accommodated in the socket, the first operating portion disposed on the exterior of the first wall lying in parallel to the first main face, and the second operating portion disposed on the exterior of the second wall lying in parallel to the second main face in the accommodated state. Therefore, a user is able to perform an operation from either of main faces of the first unit.

BRIEF DESCRIPTION OF DRAWINGS

FIG. 12A is another perspective view of the component parts of the socket, among the component parts of the lock mechanism of the electronic device according to this exemplary embodiment (some members are omitted).

FIG. 12B is a plan view of the component parts of the socket, among the component parts of the lock mechanism of the electronic device according to this exemplary embodiment (some members are omitted).

FIG. 12C is a cross-sectional view taken along line 12C-12C illustrated in FIG. 12B.

DETAILED DESCRIPTION

Exemplary embodiments will be described herein in detail with reference to the drawings appropriately. However, detailed descriptions more than necessary might be sometimes omitted. For example, detailed descriptions of already known items and duplicated descriptions of substantially identical configurations might be sometimes omitted. Such omissions are for preventing following description from becoming redundant more than necessary, and for helping those skilled in the art easily understand the following description.

Note that the attached drawings and the following description are provided for those skilled in the art to fully understand the present disclosure, and are not intended to limit the subject matter as described in the appended claims.

First Exemplary Embodiment

A first exemplary embodiment will be described herein with reference to the drawings.

[1. Configuration]

[1-1. Outline of Electronic Device]

Figure 1:
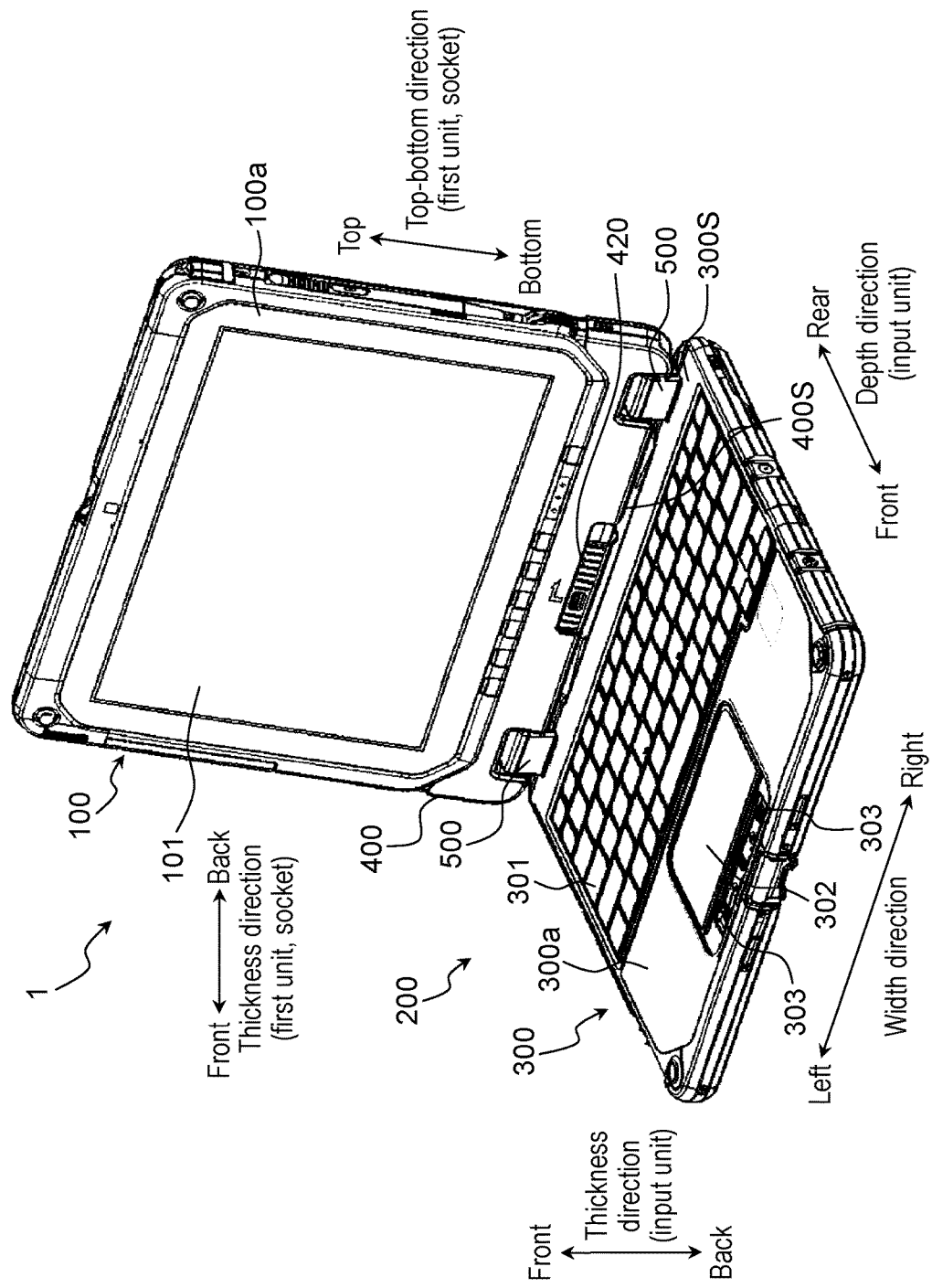
FIG. 1 is a front perspective view of an electronic device according to this exemplary embodiment.
Figure 2:
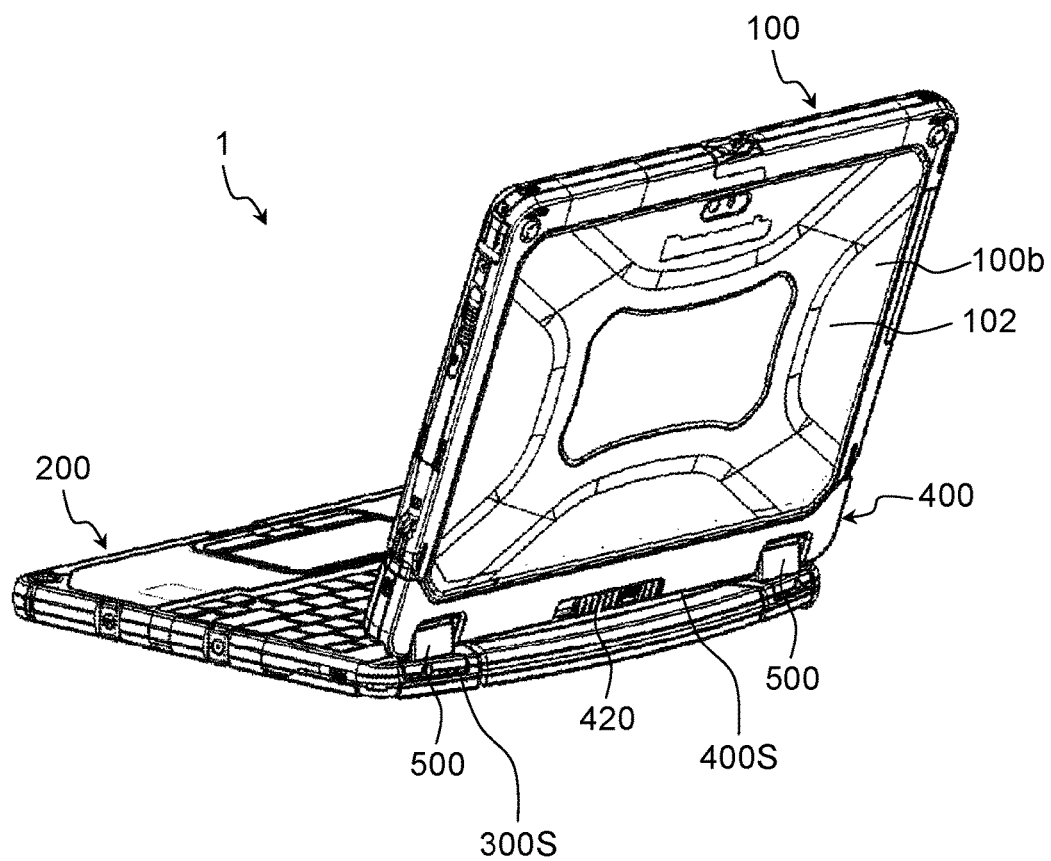
FIG. 2 is a back perspective view of the electronic device according to this exemplary embodiment.

FIG. 1 is a front perspective view of electronic device 1 according to this exemplary embodiment. FIG. 1 illustrates an appearance of electronic device 1 being open. FIG. 2 is a back perspective view of electronic device 1 according to this exemplary embodiment. FIG. 1 and other drawings define descriptions regarding directions of devices, units, and other components. A width direction is used as an identical direction for electronic device 1, first unit 100, second unit 200, input unit 300, and socket 400, and is sometimes simply referred in here to as the "width direction". In this exemplary embodiment, a rotation shaft center direction of each of hinges 500 is a direction parallel to the above described width direction. In other drawings than FIG. 1, directions of subject units are defined. The above described definitions have been provided to make descriptions easily understandable, and are not intended to specify absolute disposition conditions for components, directions when used, and other conditions.

As illustrated in FIG. 1, electronic device 1 includes first unit 100 (a tablet computer), and second unit 200 (a unit including keyboard 301 and other components). First unit 100 and second unit 200 are detachable, and therefore electronic device 1 is configured so to speak as a detachable computer.

Figure 3A:
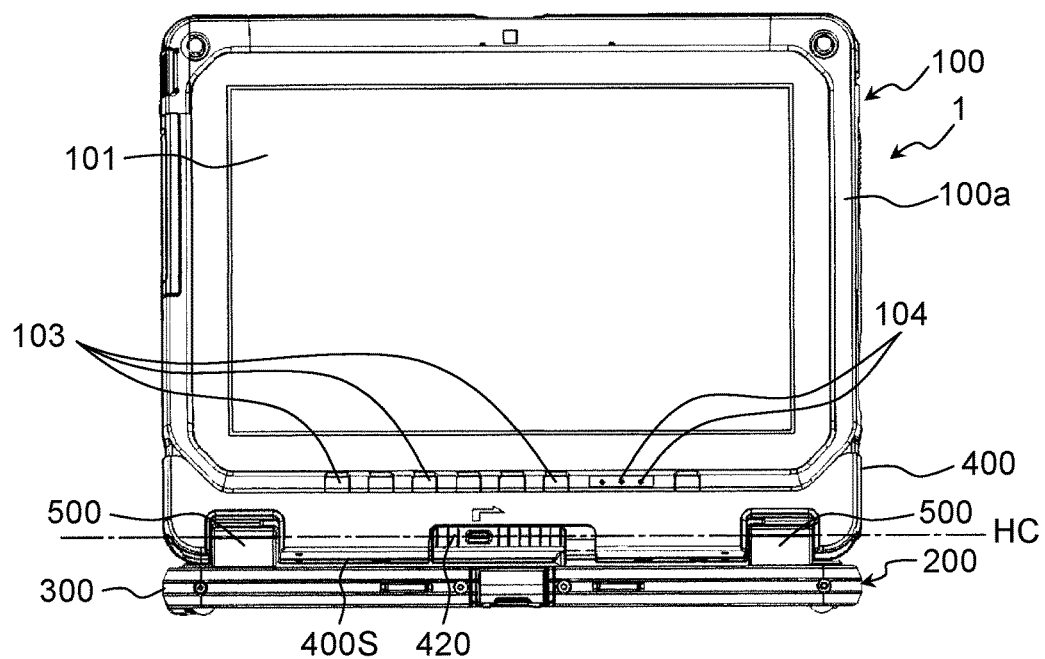
FIG. 3A is a front view of the electronic device according to this exemplary embodiment (a first unit is fitted to a second unit).
Figure 3B:
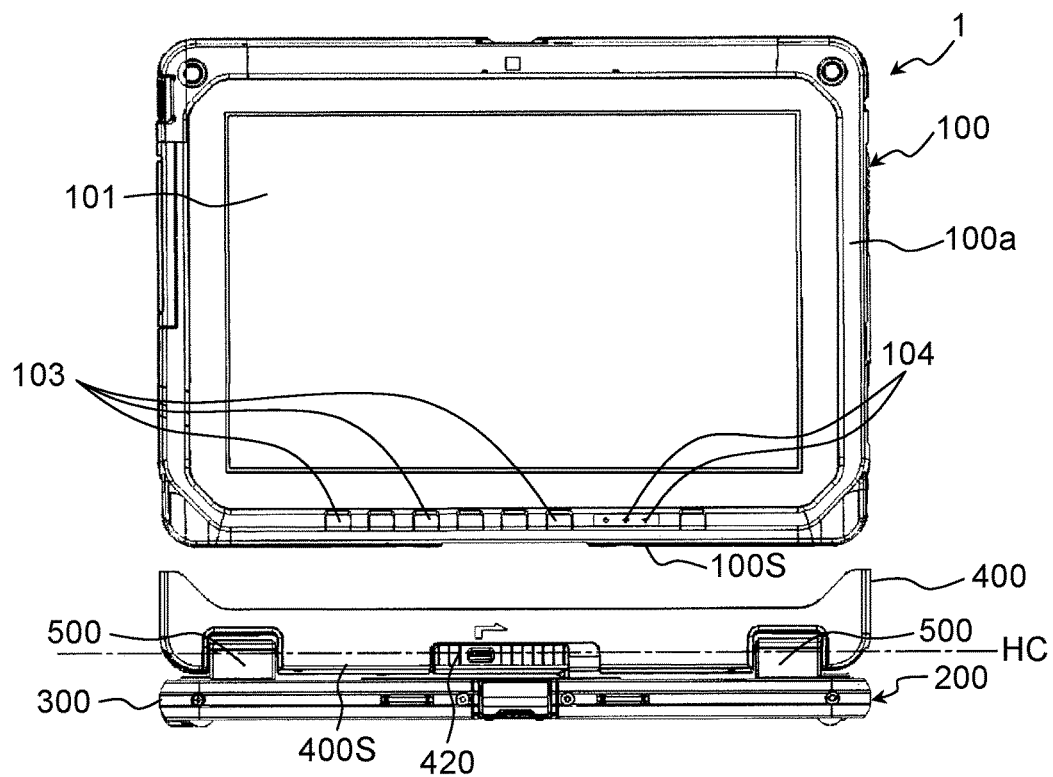
FIG. 3B is another front view of the electronic device according to this exemplary embodiment (the first unit is removed from the second unit).

FIGS. 3A and 3B are front views of electronic device 1 according to this exemplary embodiment. Specifically, FIG. 3A illustrates first unit 100 and second unit 200 attached with each other, and FIG. 3B illustrates first unit 100 and second unit 200 detached from each other.

As illustrated in FIGS. 1 to 3B, first unit 100 is a tablet computer. First unit 100 includes display 101 on first main face 100a (a front face in a thickness direction). Display 101 is, for example, a liquid crystal panel. Display 101 is also a touch panel capable of accepting a touch operation performed by a user. First unit 100 is incorporated with a central processing unit (CPU), a volatile storage device (RAM), a non-volatile storage device (e.g., ROM and SSD), a battery, and other components. Second main face 100b (a back face in the thickness direction) includes cover 102 that is detachable. The non-volatile storage device (e.g., ROM and SSD) contains, for example, an operating system (OS), various application programs, and various data. The central processing unit (CPU) reads the OS, the application programs, and the various data, and executes arithmetic processing to achieve various functions.

Second unit 200 includes an input portion allowing a user to execute input processing, and is detachable with respect to first unit 100. Second unit 200 includes input unit 300, socket 400, and hinges 500.

A housing of input unit 300 is made of, for example, a metal such as a magnesium alloy or a resin. Main face 300a (the front face in the thickness direction) of input unit 300 is provided with the input portion including keyboard 301, touch pad 302, a plurality of operation buttons 303, and other devices.

Socket 400 is capable of accommodating side 100S lying on a lower side in a top-bottom direction of first unit 100 (a first side: hereinafter appropriately referred to as "lower side 100S").

Hinges 500 couple side 300S lying on a rear side in a depth direction of input unit 300 (a second side: hereinafter appropriately referred to as "rear side 300S") and side 400S lying on a lower side in the top-bottom direction of socket 400 (a third side: hereinafter appropriately referred to as "lower side 400S") so that input unit 300 and socket 400 are relatively rotatable. Hinges 500 each have rotation shaft center HC parallel to the width direction of electronic device 1. Hinges 500 are capable of holding first unit 100 and second unit 200 opening each other, for example, as illustrated in FIGS. 1, 2, at an angle of approximately 100 degrees. Hinges 500 enable first unit 100 to close with respect to second unit 200 (in a state where first main face 100a of first unit 100 and main face 300a of input unit 300 of second unit 200 face close each other to be almost parallel).

Socket 400 is provided with connector 460 to be connected to connector 120 (see FIG. 4) of first unit 100 while lower side 100S of first unit 100 is being accommodated. Via connector 120 and connector 460, various signals and electric power can be transferred between first unit 100 and second unit 200. For example, signals output from the input portion, such as keyboard 301, touch pad 302, and the plurality of operation buttons 303 of input unit 300 of second unit 200 can be output to first unit 100. First unit 100 can receive these signals to perform controls based on the received signals. Accordingly, electronic device 1 can be used as a laptop computer when first unit 100 and second unit 200 are attached with each other. Single first unit 100 may be used as a tablet computer.

[1-2. Configuration of Lock Mechanism]

Electronic device 1 according to this exemplary embodiment includes a lock mechanism for preventing first unit 100 attached (coupled) to second unit 200 from being detached from second unit 200. In other words, electronic device 1 includes the lock mechanism capable of locking first unit 100 and second unit 200 coupled each other. The lock mechanism will be described herein in detail.

[1-2-1. Configuration of Component Parts of Lock Mechanism on First Unit]

Figure 4:
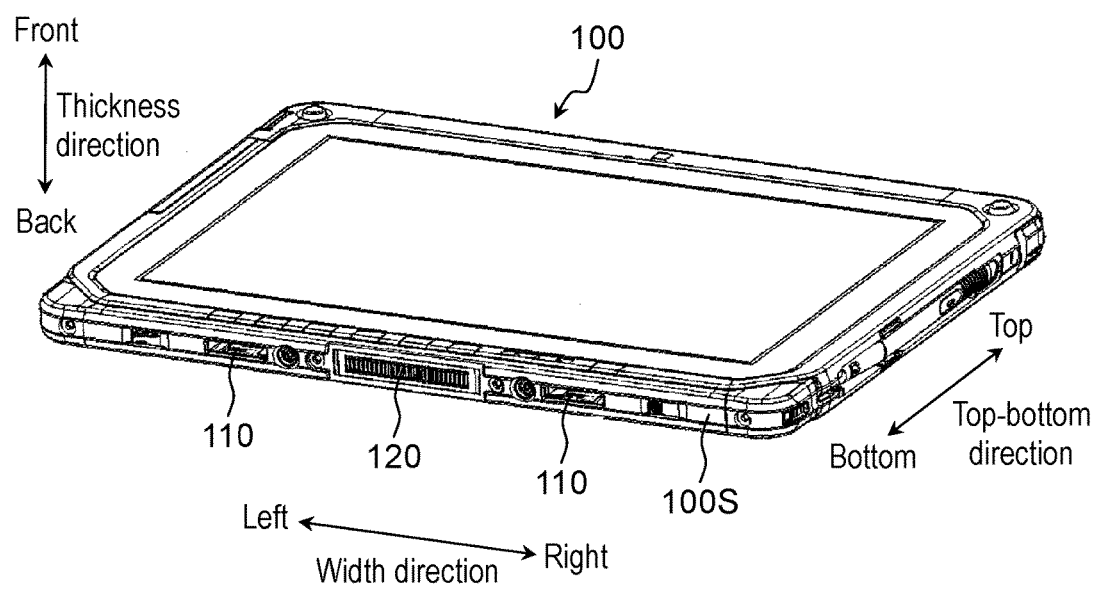
FIG. 4 is a perspective view of the first unit (a tablet computer) of the electronic device according to this exemplary embodiment.

FIG. 4 is a perspective view of first unit 100 (a tablet computer) of electronic device 1 according to this exemplary embodiment. Lower side 100S of first unit 100 is provided with engaging-target portions 110 as component parts of the lock mechanism on first unit 100. Engaging-target portions 110 are respectively capable of engaging with engaging members 443 (see FIG. 7A) of engaging portions 440 configuring the lock mechanism on second unit 200. Two engaging-target portions 110 are provided on lower side 100S, and are separated in the width direction of first unit 100.

Figure 5:
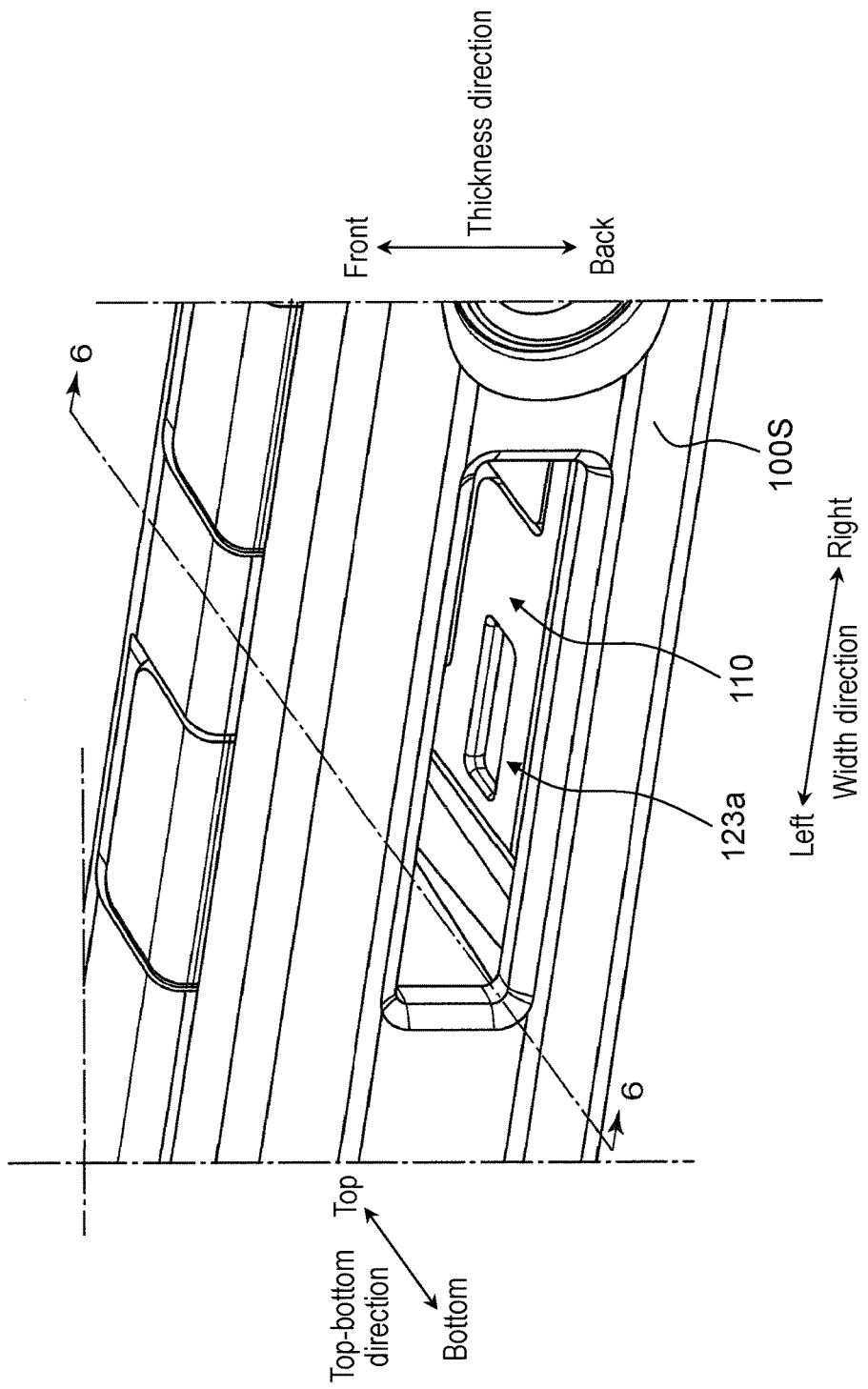
FIG. 5 is an enlarged perspective view of an engaging-target portion of the first unit of the electronic device according to this exemplary embodiment.
Figure 6:
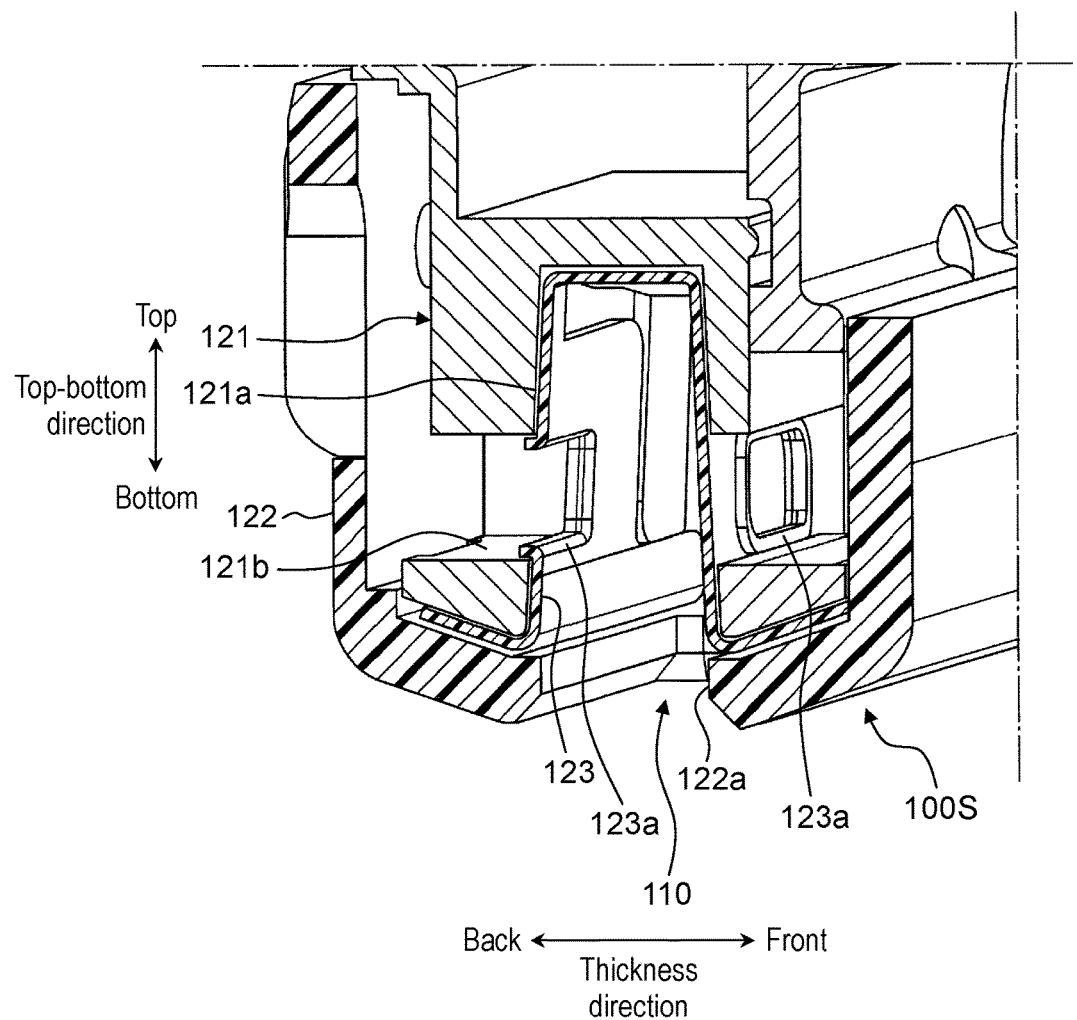
FIG. 6 is a cross-sectional view taken along line 6-6 illustrated in FIG. 5.

FIG. 5 is an enlarged perspective view of one of engaging-target portions 110 of first unit 100 of electronic device 1 according to this exemplary embodiment. FIG. 6 is a cross-sectional view taken along line 6-6 illustrated in FIG. 5.

As illustrated in the drawings, engaging-target portions 110 each are configured as a recess capable of engaging with each of engaging members 443 described later. First unit 100 includes frame 121 made of a metal, and side cover 122 made of a resin. Frame 121 is a member configuring a framework and a part of an exterior of first unit 100. Side cover 122 is a frame-shaped member that covers the exterior of lower side 100S of first unit 100. Recesses 121a are formed on frame 121, while openings 122a are formed on side cover 122. An inner surface of each of recesses 121a of frame 121 is attached with protection member 123 made of a metal. Each of protection members 123 is provided with engaging holes 123a capable of engaging with engaging pieces 443a (see FIG. 7B), described later, of each of engaging members 443. Inside each of recesses 121a of frame 121, engaging recesses 121b capable of engaging with engaging pieces 443a of each of engaging members 443 are further provided. Protection member 123 is, preferably for wear prevention, made of a stainless steel material instead of a magnesium material.

[1-2-2. Configuration of Component Parts of Lock Mechanism and Socket on Second Unit]

[1-2-2-1. Configuration of Socket]

Component parts of the lock mechanism on second unit 200 are accommodated in socket 400.

Figures 7A, 7B:
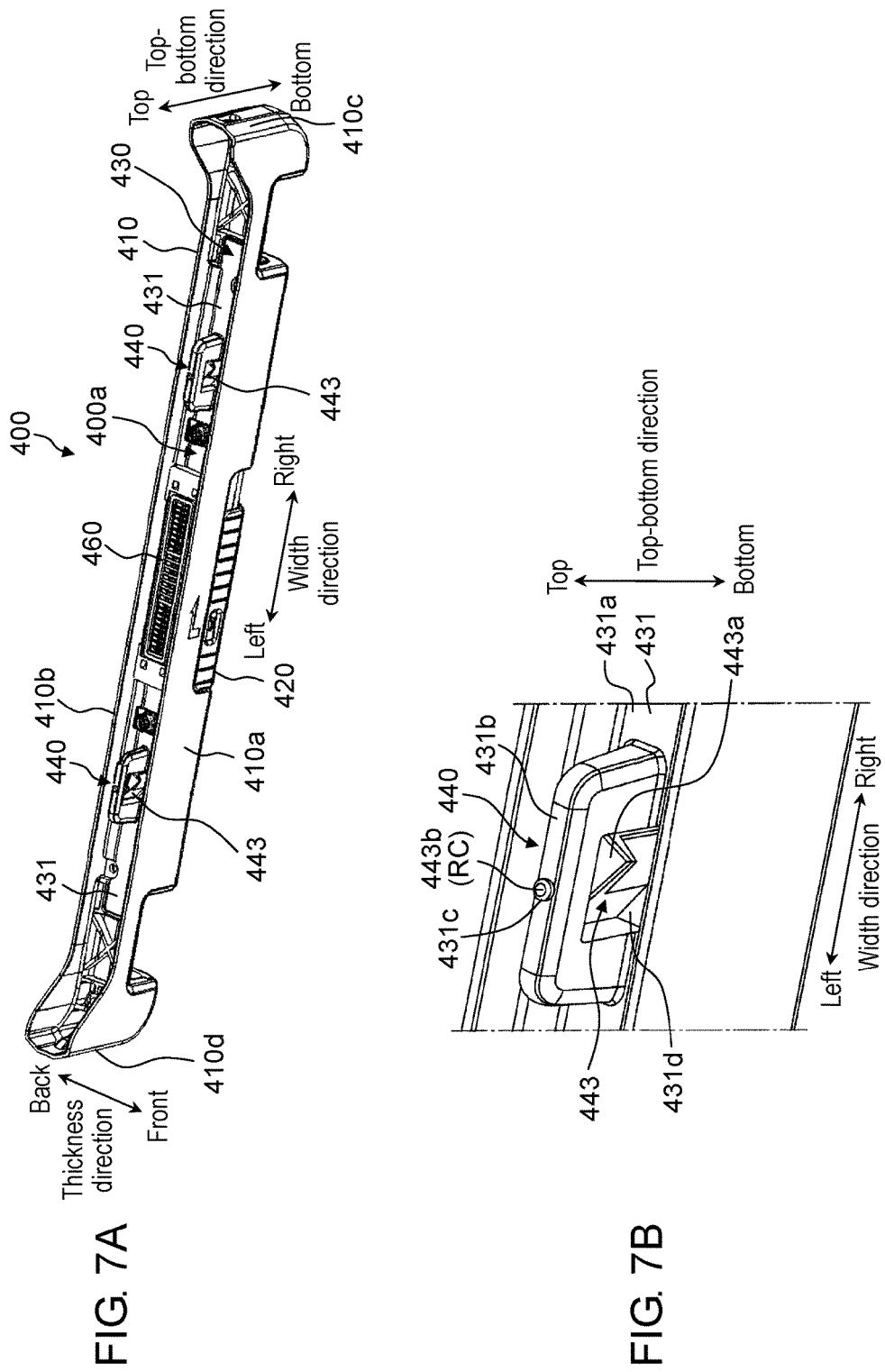
FIG. 7A is a perspective view of a socket of the second unit of the electronic device according to this exemplary embodiment (an engaging member lies at a first rotational position).
FIG. 7B is a partial enlarged perspective view of the engaging member of the socket of the second unit of the electronic device according to this exemplary embodiment (the engaging member lies at the first rotational position).

FIGS. 7A and 7B are external views of socket 400 of electronic device 1 according to this exemplary embodiment (engaging members 443 each lie at a first rotational position). Specifically, FIG. 7A is a perspective view of socket 400, and FIG. 7B is a partial enlarged perspective view of one of engaging members 443.

Figure 8A:
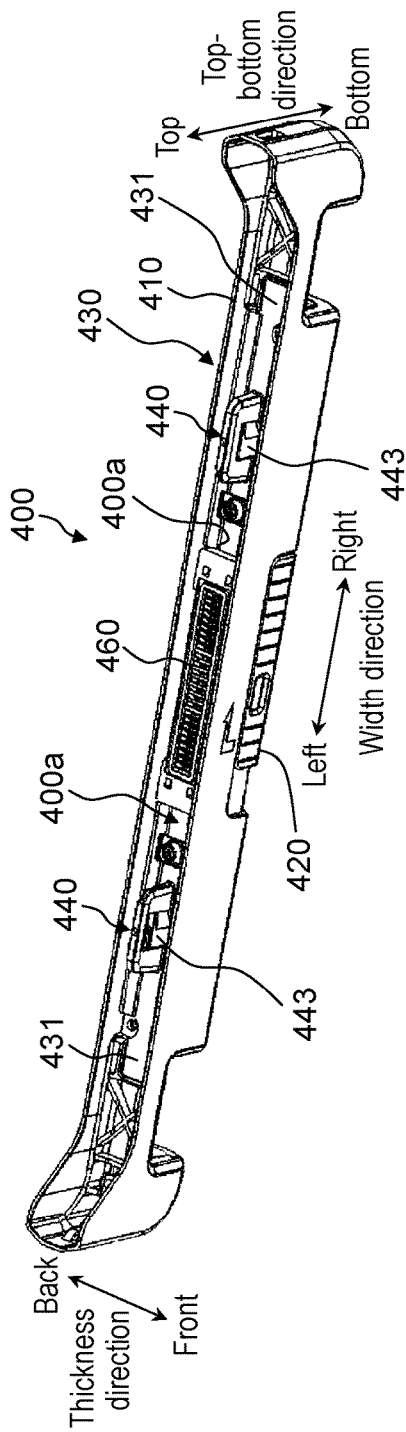
FIG. 8A is another perspective view of the socket of the second unit of the electronic device according to this exemplary embodiment (the engaging member lies at a second rotational position).
Figure 8B:
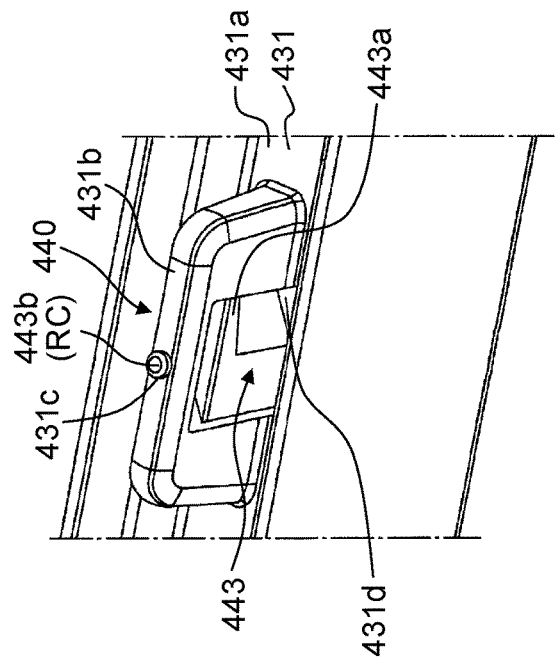
FIG. 8B is another partial enlarged perspective view of the engaging member of the socket of the second unit of the electronic device according to this exemplary embodiment (the engaging member lies at the second rotational position).

FIGS. 8A and 8B are external views of socket 400 of electronic device 1 according to this exemplary embodiment (engaging members 443 each lie at a second rotational position). Specifically, FIG. 8A is a perspective view of socket 400, and FIG. 8B is a partial enlarged perspective view of the one of engaging members 443.

Figure 11:
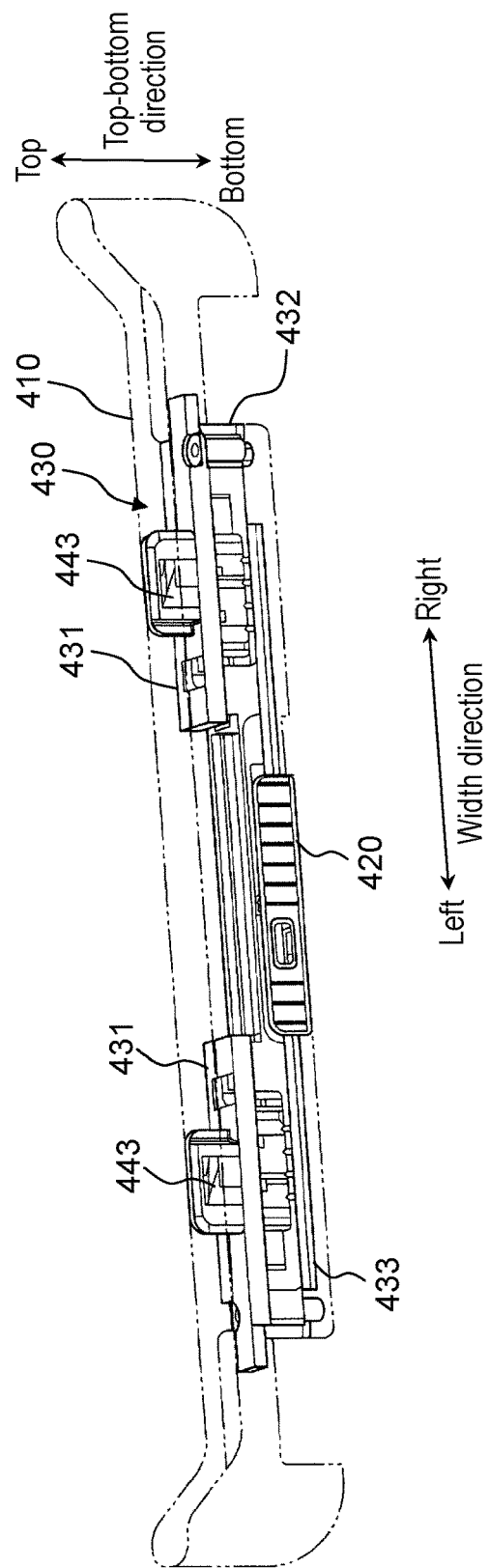
FIG. 11 is a perspective view of component parts of the socket, among component parts of a lock mechanism of the electronic device according to this exemplary embodiment.

Socket 400 includes socket main body 410, operating member 420, engaging portions 440 including engaging members 443, and drive mechanism 430 (see FIG. 11).

Socket 400 has a boat shape extending in the width direction of electronic device 1, and includes recesses 400a capable of fitting with lower side 100S of first unit 100.

Engaging portions 440 are configured, as will be described later, to respectively be engageable with engaging-target portions 110 on lower side 100S of first unit 100. Engaging members 443 are each configured, as will be described later in detail, to be rotatable about rotation shaft center RC (a shaft center of rotation shaft 443b) that is parallel to the top-bottom direction of socket 400. Two engaging members 443 are respectively provided on top faces of circuit board units 431a of support members 431, and are separated in the width direction of socket 400. Two engaging members 443 are disposed in a positional relationship of being engageable with engaging-target portions 110 of first unit 100 when lower side 100S of first unit 100 is fitted to socket 400. Engaging members 443 are disposed so as to project upward beyond the top faces of circuit board units 431a of support members 431 (predetermined face of the second unit).

When operating member 420 lies at the first position illustrated in FIG. 7A (a predetermined leftward position in the width direction), engaging members 443 rotate to the first rotational position (a position where engaging pieces 443a of each of engaging members 443 project frontward and backward in the thickness direction beyond each of engaging member supports 431b of support members 431), and engage with engaging-target portions 110. When operating member 420 lies at the second position illustrated in FIG. 8A (a predetermined rightward position in the width direction), engaging members 443 rotate to the second rotational position (a position where engaging pieces 443a of each of engaging members 443 do not project in the thickness direction beyond each of engaging member supports 431b of support members 431), and disengage from engaging-target portions 110.

[1-2-2-2. Socket Main Body]

Figure 9A:
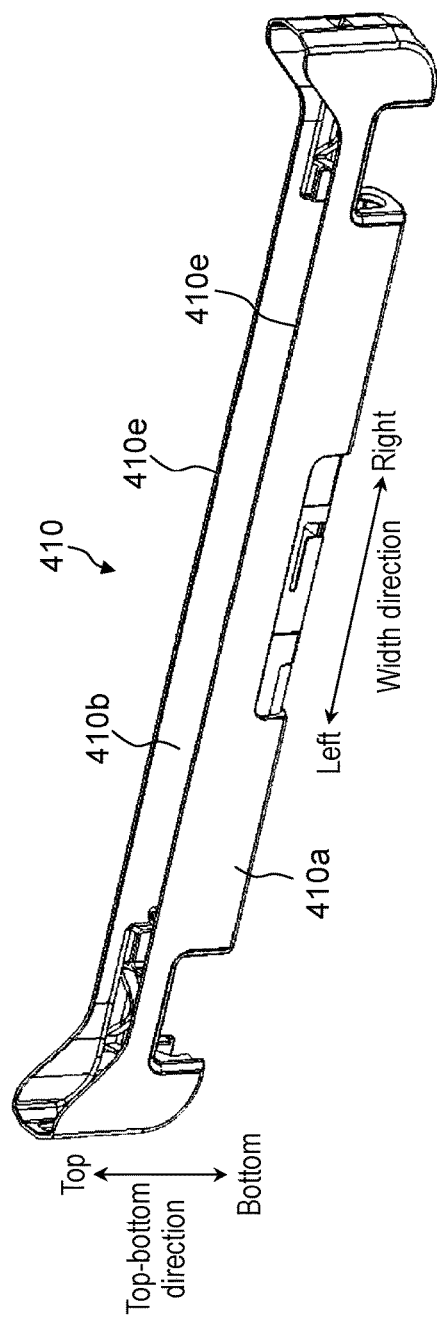
FIG. 9A is a perspective view of a socket main body of the electronic device according to this exemplary embodiment.
Figure 9B:
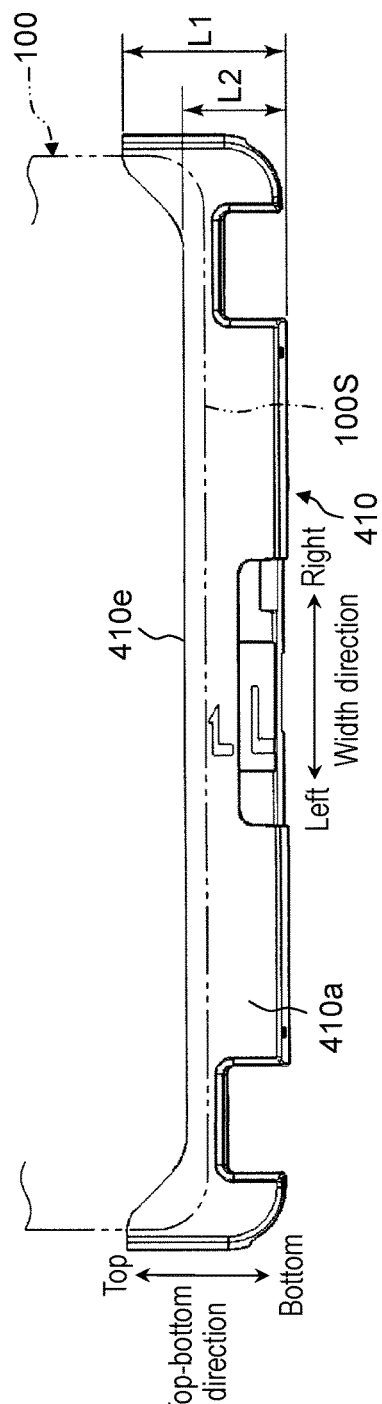
FIG. 9B is a side view of the socket main body of the electronic device according to this exemplary embodiment.

FIGS. 9A and 9B are external views of socket main body 410 of electronic device 1 according to this exemplary embodiment. Specifically, FIG. 9A is a perspective view of socket main body 410, and FIG. 9B is a side view of socket main body 410.

Socket main body 410 has a boat shape, and accommodates drive mechanism 430 (see FIG. 11). Socket main body 410 is made of a resin. Socket main body 410 may be made of a metal such as a magnesium alloy.

Figure 10:
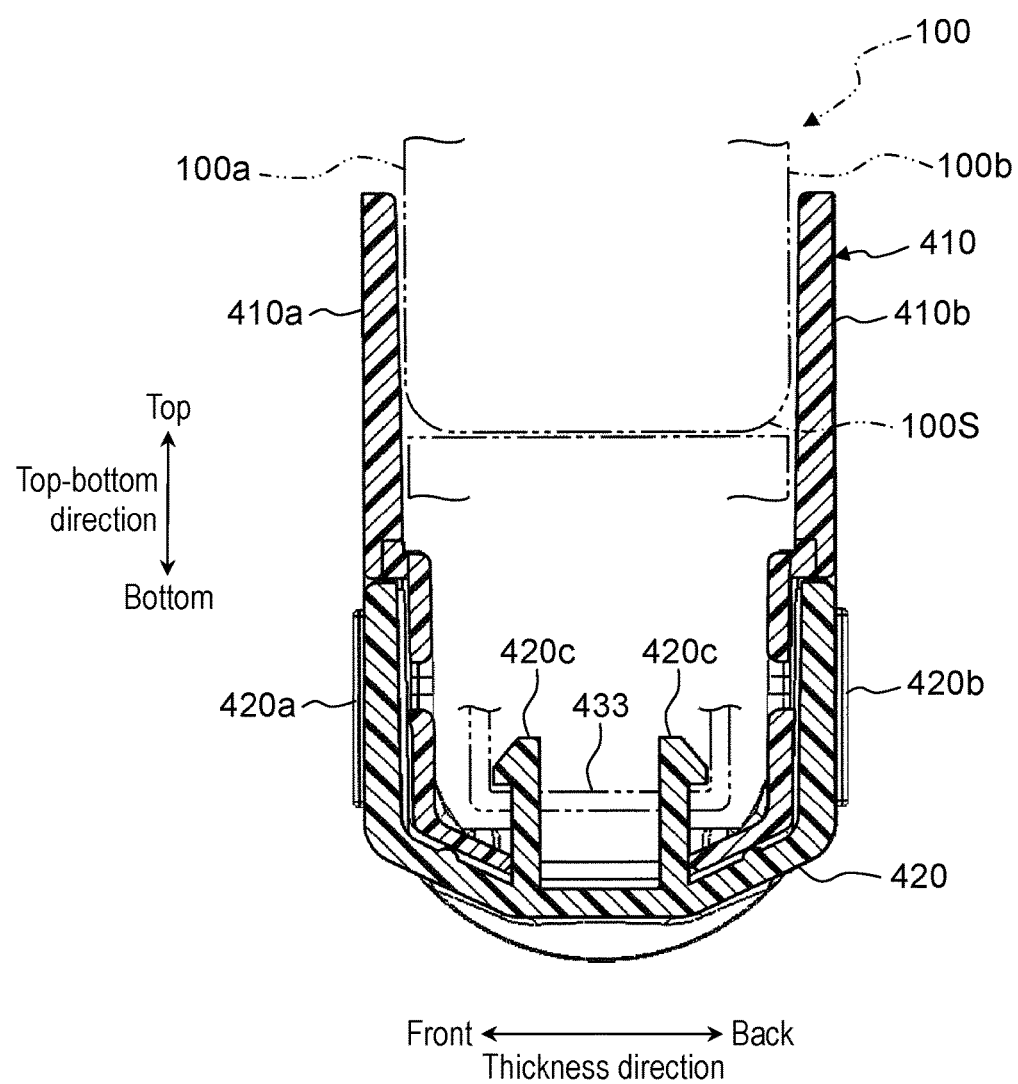
FIG. 10 is a cross-sectional view taken along line 10-10 illustrated in FIG. 12B (some members are omitted).

FIG. 10 is a cross-sectional view taken along line 10-10 illustrated in FIG. 12B (some members are omitted). FIG. 10 illustrates, at a position of line 10-10, a cross section perpendicular to the width direction (a longitudinal direction, an extending direction) of socket 400. Although, in this exemplary embodiment, the width direction, the longitudinal direction, and the extending direction of socket 400, lower side 100S, and rear side 300S are an identical direction, a term representing any one of the directions will be used appropriately in line with a content of description regarding each member for easy understanding. Socket main body 410 has first wall 410a and second wall 410b. In an accommodated state where socket 400 accommodates lower side 100S of first unit 100, first wall 410a extends in parallel to the extending direction of lower side 100S of first unit 100 (see FIG. 9B), and lies in parallel to first main face 100a of first unit 100. First wall 410a supports a portion, near lower side 100S, of first main face 100a. In the above described accommodated state, second wall 410b extends in parallel to the extending direction of lower side 100S of first unit 100 (see FIGS. 9A and 9B), and lies in parallel to second main face 100b (back face) of first unit 100. Second wall 410b supports a portion, near lower side 100S, of second main face 100b. Socket main body 410 has an approximately U-shaped cross section perpendicular to the extending direction.

According to the above described configuration, first unit 100 is supported by first wall 410a and second wall 410b of socket 400 with the portion, near lower side 100S, of first main face 100a and the portion, near lower side 100S, of second main face 100b being pinched between first wall 410a and second wall 410b.

As illustrated in FIGS. 3A and 3B, operation switches 103 and indicators 104 are disposed on the portion, near lower side 100S, of first main face 100a of first unit 100, below display 101, and at around a center in the width direction (a portion other than ends in the extending direction) of socket 400. Therefore, at this portion, a length (a height) in the top-bottom direction of first wall 410a should be set so that the first wall 410a does not interfere with operation switches 103 and indicators 104, but an enough height cannot be secured.

To solve this problem, in this exemplary embodiment, as illustrated in FIG. 9B, in socket main body 410, length L1, of each of first wall 410a and second wall 410b, which extends in the top-bottom direction of socket 400 (a direction perpendicular to the extending direction) and is measured at each of the ends in the width direction (the extending direction) of socket 400, is extended longer than length L2, which extends in the top-bottom direction and is measured at a portion other than the ends in the width direction (the extending direction) of socket 400. On each of first wall 410a and second wall 410b, opening side end 410e lies at a central portion in the width direction (a support portion other than the ends in the extending direction) of socket 400. Each of opening side ends 410e is formed linearly and in parallel to the width direction (the extending direction) when a socket main body is viewed from the side (when viewed perpendicularly to the first wall and the second wall) as illustrated in FIG. 9B.

Therefore, even when at least either member of operation switches 103 (a second operating portion) and indicators 104 is disposed on the portion, near lower side 100S, of first main face 100a of first unit 100, at a center in the width direction, first unit 100 can be supported at the ends in the width direction at higher positions by first wall 410a and second wall 410b. Accordingly, first unit 100 accommodated in socket 400 of second unit 200 can be stably supported. Since each of opening side ends 410e at the central portion in the width direction of socket 400 has been formed linearly and in parallel to the width direction, no portions interfere with first unit 100 when first unit 100 is accommodated into socket 400, and thus first unit 100 can be smoothly accommodated into socket 400.

As illustrated in FIG. 7A, socket main body 410 includes third wall 410c coupling the right end in the width direction (the extending direction) of first wall 410a and the right end in the width direction of second wall 410b, and fourth wall 410d coupling the left end of in the width direction of first wall 410a and the left end in the width direction of second wall 410b.

Therefore, socket 400 (socket main body 410) can be further strengthened. For example, first wall 410a and second wall 410b can be prevented as much as possible from collapsing in either of directions toward which first wall 410a and second wall 410b are separated from each other. Therefore, first unit 100 attached to socket 400 of second unit 200 can be supported more stably.

[1-2-2-3. Operating Member]

Operating member 420 is a member for accepting a lock release operation performed by a user. Operating member 420 is made of a resin. Operating member 420 may be made of a metal such as a magnesium alloy. Operating member 420 is supported by socket 400 so as to be linearly movable between the first position and the second position in the width direction of socket 400 with respect to socket main body 410.

Operating member 420 is operable from either of first main face 100a of first unit 100 and second main face 100b of first unit 100 in a state that the portion, near lower side 100S, of first unit 100 is accommodated in socket 400, as illustrated in FIGS. 1, 2. A specific description will be given.

FIG. 10 is a cross-sectional view taken along line 10-10 illustrated in FIG. 12B (some members are omitted). Operating member 420 includes, as illustrated in FIG. 10, first operating portion 420a disposed on an exterior of first wall 410a of socket main body 410, and second operating portion 420b disposed on an exterior of second wall 410b of socket main body 410. First operating portion 420a and second operating portion 420b are coupled at respective lower portions so that operating member 420 is slidable in the width direction (the extending direction) of socket 400, on an exterior of socket 400. Operating member 420 has an approximately U-shaped cross section perpendicular to the width direction (the extending direction) of socket 400. Therefore, a user operates either of first operating portion 420a and second operating portion 420b so as to be able to operate operating member 420 from either of main faces of first unit 100. For example, as illustrated in FIG. 1, when operating electronic device 1 with first unit 100 being open with respect to second unit 200, a user can operate first operating portion 420a from first main face 100a provided with display 101 toward which the user faces. When first unit 100 is closed with respect to second unit 200, first operating portion 420a on first main face 100a cannot be operated from first main face 100a, but second operating portion 420b on second main face 100b can be operated from second main face 100b.

According to the above described configuration, since socket 400 and operating member 420 have each been formed in the approximately U-shaped cross section, an internal space of socket 400 can be effectively used, and a variety of members, mechanisms, and other components can be disposed. In this exemplary embodiment, as will be described later, the internal space of socket 400 has been effectively used to accommodate drive mechanism 430 for performing a releasing operation of engagement through the lock mechanism. In addition to drive mechanism 430, other members can be further accommodated.

[1-2-2-4. Engaging Members and Drive Mechanism]

FIG. 11 is a perspective view of component parts of socket 400, among component parts of the lock mechanism of electronic device 1 according to this exemplary embodiment.

In the component parts of the lock mechanism, the component parts of socket 400 include, as described above, operating member 420, engaging members 443, and drive mechanism 430.

[1-2-2-4-1. Drive Mechanism]

When operating member 420 is moved to the first position illustrated in FIG. 7A, drive mechanism 430 rotates engaging members 443 respectively to the first rotational position illustrated in FIGS. 7A and 7B. When operating member 420 is moved to the second position illustrated in FIG. 8A, drive mechanism 430 rotates engaging members 443 respectively to the second rotational position illustrated in FIGS. 8A and 8B. In other words, drive mechanism 430 translates a linear movement of operating member 420 between the first position and the second position into a rotation of each of engaging members 443 between the first rotational position and the second rotational position.

Drive mechanism 430 includes support members 431, base member 432, and coupling member 433.

FIGS. 12A to 12C are external views of the component parts of socket 400, among the component parts of the lock mechanism of electronic device 1 according to this exemplary embodiment (some members are omitted). Specifically, FIG. 12A is a perspective view, FIG. 12B is a plan view, and FIG. 12C is a cross-sectional view taken along line 12C-12C illustrated in FIG. 12B.

Coupling members 433 each are a plate member extending along the width direction of socket 400, and are fixed to operating member 420. For example, as illustrated in FIG. 10, coupling member 433 is, on operating member 420, engaged with engaging projections 420c extending upward so as to be fixed to operating member 420. Coupling member 433 is supported by socket main body 410 so as to be movable along a moving direction of operating member 420 (the width direction of socket 400). Coupling member 433 is made of, for example, a resin. Coupling member 433 may be made of a metal as long as a sliding characteristic equivalent to a sliding characteristic provided by a resin is secured.

Coupling member 433 includes grooves 433a (433b) with which engaging shafts 443g of engaging members 443 are engaged respectively so as to be relatively movable (see FIGS. 15A, 15B, 17A, 17B).

Figure 15A:
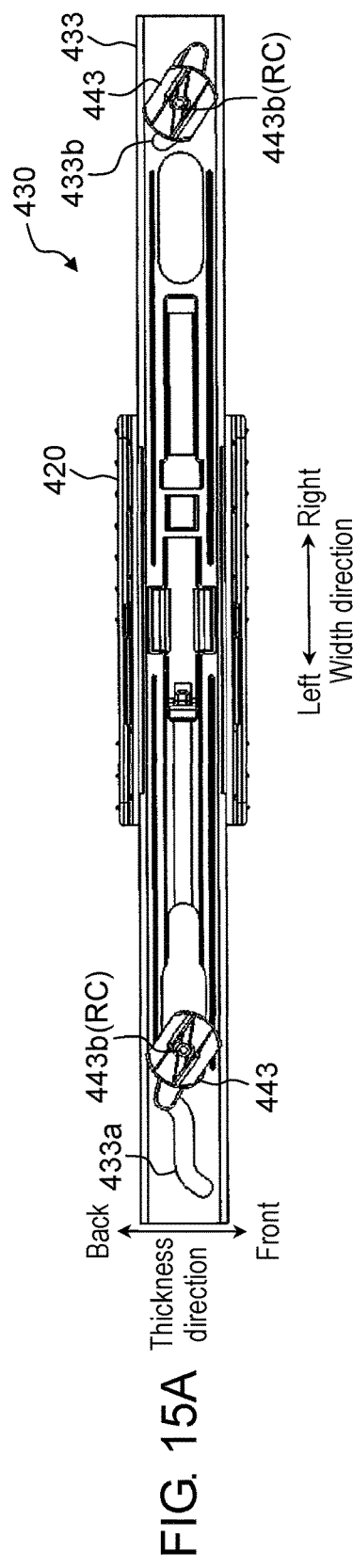
FIG. 15A is a plan view of a coupling member, an operating member, and the engaging member configuring the lock mechanism of the electronic device according to this exemplary embodiment (the operating member lies at a first position, and the engaging member lies at the first rotational position).
Figure 15B:
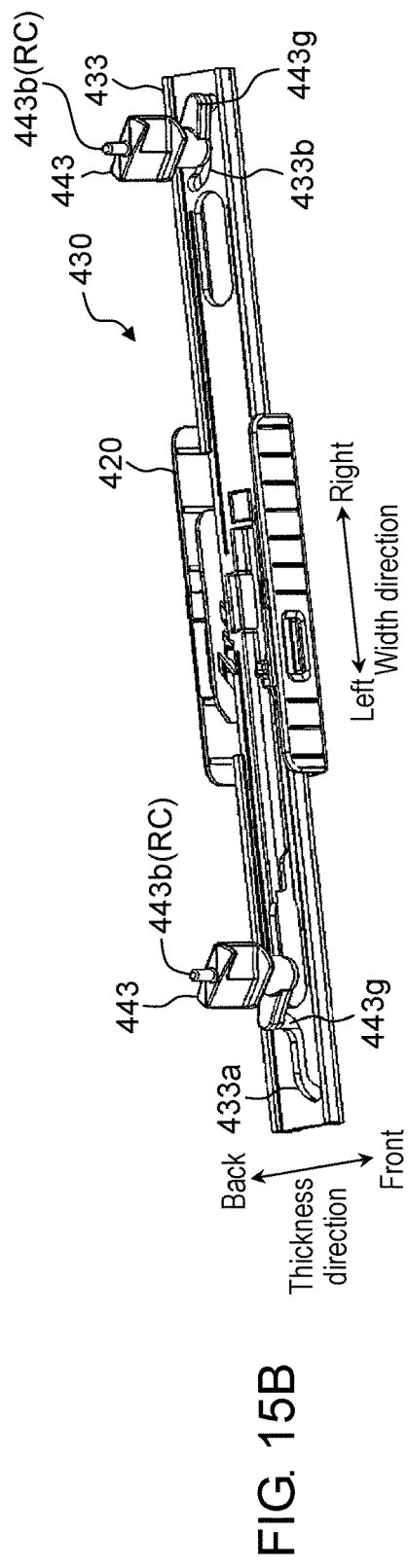
FIG. 15B is a perspective view of the coupling member, the operating member, and the engaging member configuring the lock mechanism of the electronic device according to this exemplary embodiment (the operating member lies at the first position, and the engaging member lies at the first rotational position).
Figure 17A:
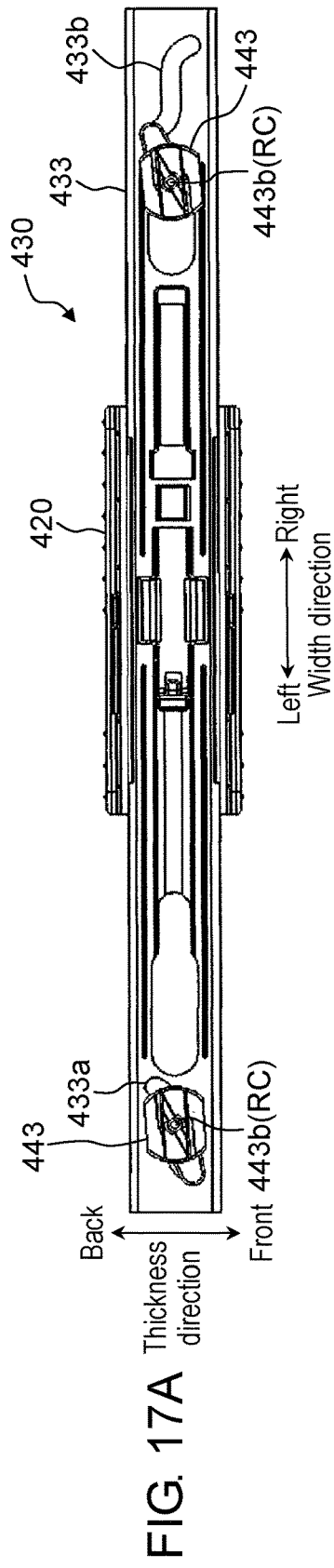
FIG. 17A is a plan view of the coupling member, the operating member, and the engaging member configuring the lock mechanism of the electronic device according to this exemplary embodiment (the operating member lies at a second position, and the engaging member lies at the second rotational position).
Figure 17B:
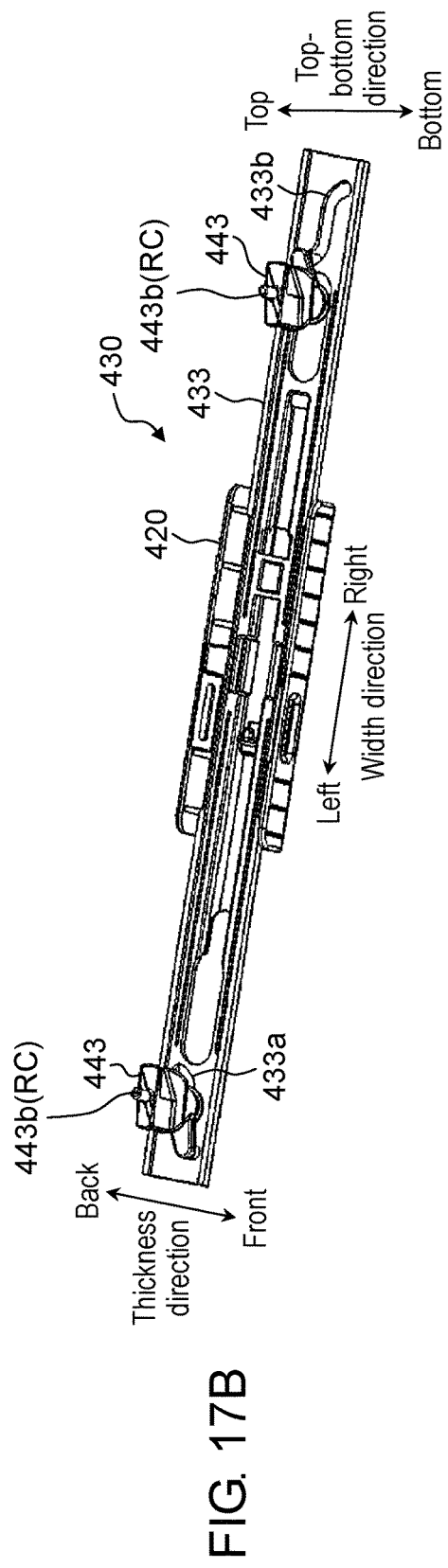
FIG. 17B is a perspective view of the coupling member, the operating member, and the engaging member configuring the lock mechanism of the electronic device according to this exemplary embodiment (the operating member lies at the second position, and the engaging member lies at the second rotational position).

Groove 433a (433b) is formed meanderingly so that, when operating member 420 is moved to the first position, as illustrated in FIGS. 15A, 15B, one of engaging members 443 is rotated about rotation shaft center RC (the shaft center of rotation shaft 443b) to the first rotational position, and when operating member 420 is moved to the second position, as illustrated in FIGS. 17A, 17B, one of engaging members 443 is rotated about rotation shaft center RC to the second rotational position. Specifically, groove 433a is formed in an approximately reversed S-shape so that its left end in the width direction lies frontward with respect to other portions in the thickness direction, while its right end in the width direction lies backward with respect to the other portions in the thickness direction. On the other hand, groove 433b is formed in an approximately S-shape so that its left end in the width direction lies backward with respect to other portions in the thickness direction, while its right end lies frontward with respect to the other portions in the thickness direction.

Referring back to FIGS. 12A to 12C, base member 432 is a member extending in the width direction of socket 400, and is fixed to socket main body 410. Base member 432 is made of, for example, a resin. Base member 432 includes rotation center shafts 432a and rotation restriction walls 432b.

Rotation center shafts 432a are respectively inserted into shaft holes 443f respectively formed on lower portions of engaging members 443 to turnably support engaging members 443 at the lower portions.

When engaging members 443 are rotated, rotation restriction walls 432b respectively abut arms 443h respectively formed on the lower portions of engaging members 443. As a result, engaging members 443 are restricted so as to be turned within a range between a first rotational position and a second rotational position.

Referring back to FIGS. 7A and 7B, support members 431 are respectively disposed near the right and left ends in the width direction of socket 400. Support members 431 are plate members extending along the width direction of socket 400. Support members 431 are fixed to socket main body 410. Support members 431 are made of, for example, a metal. Support members 431 each include circuit board unit 431a, engaging member support 431b, and engaging member disposition hole 431d.

Circuit board units 431a are mounted on base member 432, and fixed to base member 432 and socket main body 410.

Engaging member disposition holes 431d are, on circuit board units 431a, through holes opening in the top-bottom direction of socket 400, into which tops of engaging members 443 are respectively turnably fitted. Therefore, engaging members 443 are disposed so as to project upward beyond the top faces of circuit board units 431a.

Engaging member supports 431b are raised on circuit board units 431a so as to straddle engaging member disposition holes 431d respectively in the width direction. Engaging member supports 431b each have a gate shape. Engaging member supports 431b each have rotation shaft through hole 431c passing through in the top-bottom direction of socket 400. When rotation shafts 443b of engaging members 443 are respectively inserted into rotation shaft through holes 431c, engaging member supports 431b respectively support engaging members 443 at respective tops so that engaging members 443 are respectively turnable about rotation shafts 443b.

[1-2-2-4-2. Engaging Members]

Figure 13A:
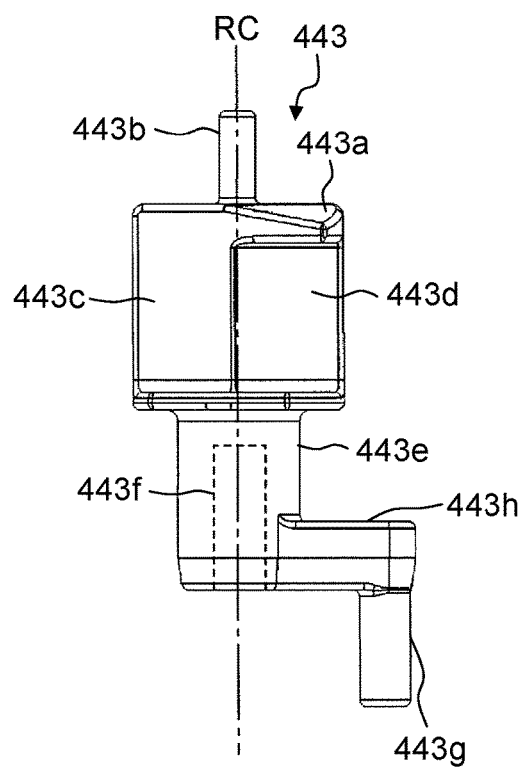
FIG. 13A is a front view of the engaging member configuring the lock mechanism of the electronic device according to this exemplary embodiment.
Figure 13B:
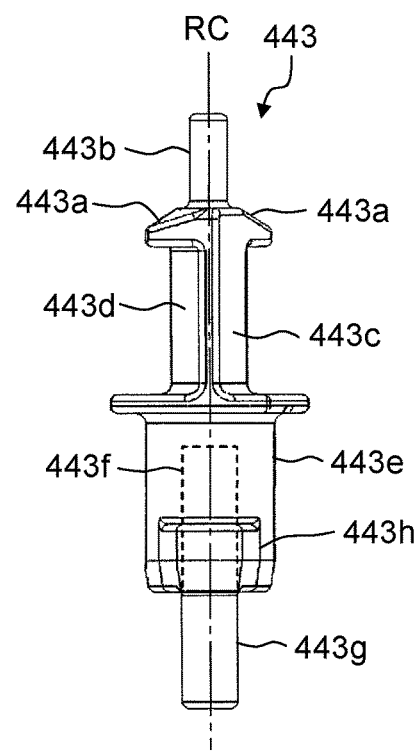
FIG. 13B is a side view of the engaging member configuring the lock mechanism of the electronic device according to this exemplary embodiment.
Figure 13C:
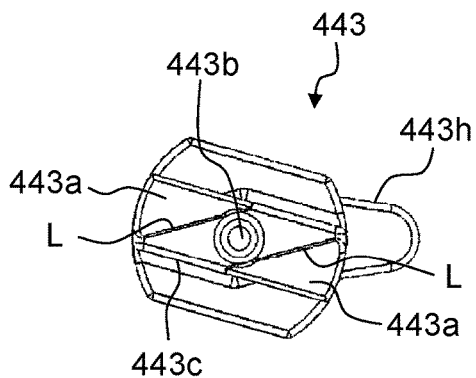
FIG. 13C is a plan view of the engaging member configuring the lock mechanism of the electronic device according to this exemplary embodiment.

FIGS. 13A to 13C are external views of one of engaging members 443 configuring the lock mechanism of electronic device 1 according to this exemplary embodiment. Specifically, FIG. 13A is a front view, FIG. 13B is a side view, and FIG. 13C is a plan view.

Engaging members 443 each include, as illustrated in FIGS. 13A, 13B, 13C, from top, rotation shaft 443b described above, engaging body 443c, cylinder 443e, arm 443h, and engaging shaft 443g.

Rotation shaft 443b is provided on a top end of each of engaging members 443.

Engaging body 443c includes a pair of engaging pieces 443a each formed to project in a radial direction around rotation shaft 443b. Engaging pieces 443a are formed by cutting sides of a cylindrical body in parallel around rotation shaft 443b (rotation shaft center RC), and then by machining portions radially outward with respect to lines represented by L, on portions other than portions near a top face.

Cylinder 443e has shaft hole 443f opening at a bottom end. A shaft center of shaft hole 443f and a shaft center of rotation shaft 443b are formed on a single shaft center.

Arm 443h extends externally in the radial direction from the bottom end of cylinder 443e.

Engaging shaft 443g extends downward in parallel to rotation shaft 443b (rotation shaft center RC) from an outer end in the radial direction of arm 443h.

Figure 14:
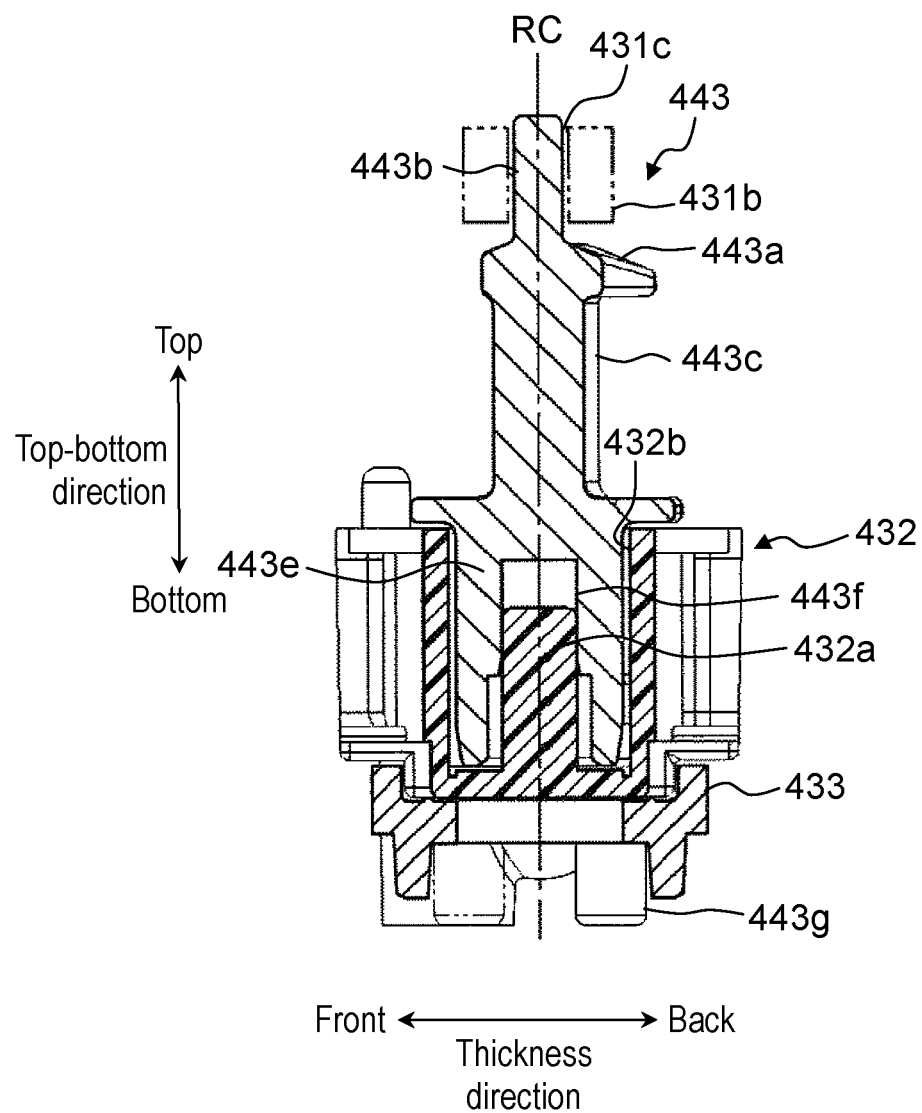
FIG. 14 is a cross-sectional view taken along line 14-14 illustrated in FIG. 12B.

FIG. 14 is a cross-sectional view taken along line 14-14 illustrated in FIG. 12B. FIG. 14 illustrates a state where operating member 420 lies at the first position, and each of engaging members 443 lies at the first rotational position. Rotation shaft 443b is inserted into rotation shaft through hole 431c. Shaft hole 443f is fitted with rotation center shaft 432a of base member 432. As described above, the shaft center of shaft hole 443*f* and the shaft center of rotation shaft 443*b* are formed on a single shaft center. Therefore, engaging members 443 are respectively rotatable about centers of rotation shafts 443*b* and shaft holes 443*f* as rotation shaft centers RC (the centers).

[2. Action]

FIGS. 15A and 15B are external views of coupling member 433, operating member 420, and engaging members 443 configuring the lock mechanism of electronic device 1 according to this exemplary embodiment. Specifically, FIG. 15A is a plan view when operating member 420 lies at the first position, and engaging members 443 each lie at the first rotational position, and FIG. 15B is a perspective view.

Figure 16A:
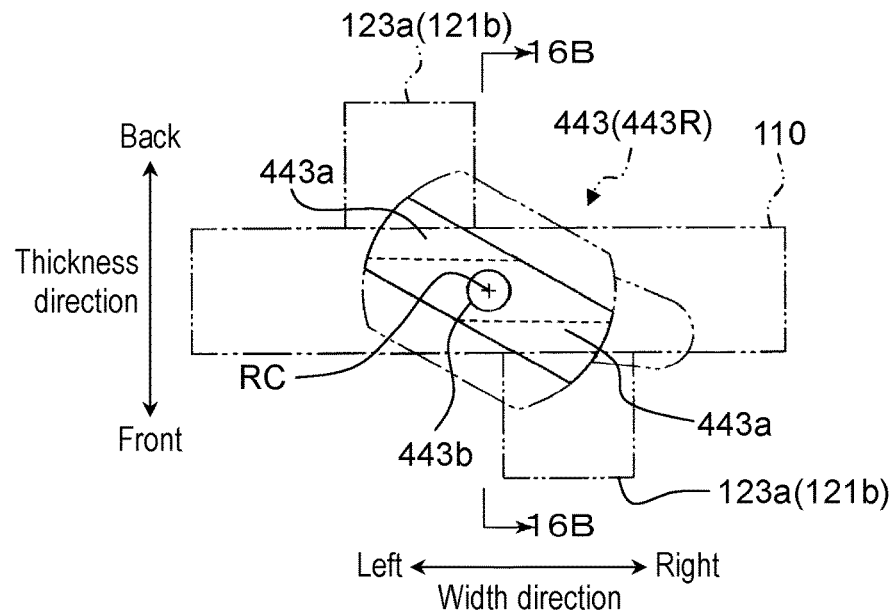
FIG. 16A is a plan view for describing an engagement state through the lock mechanism of the electronic device according to this exemplary embodiment.
Figure 16B:
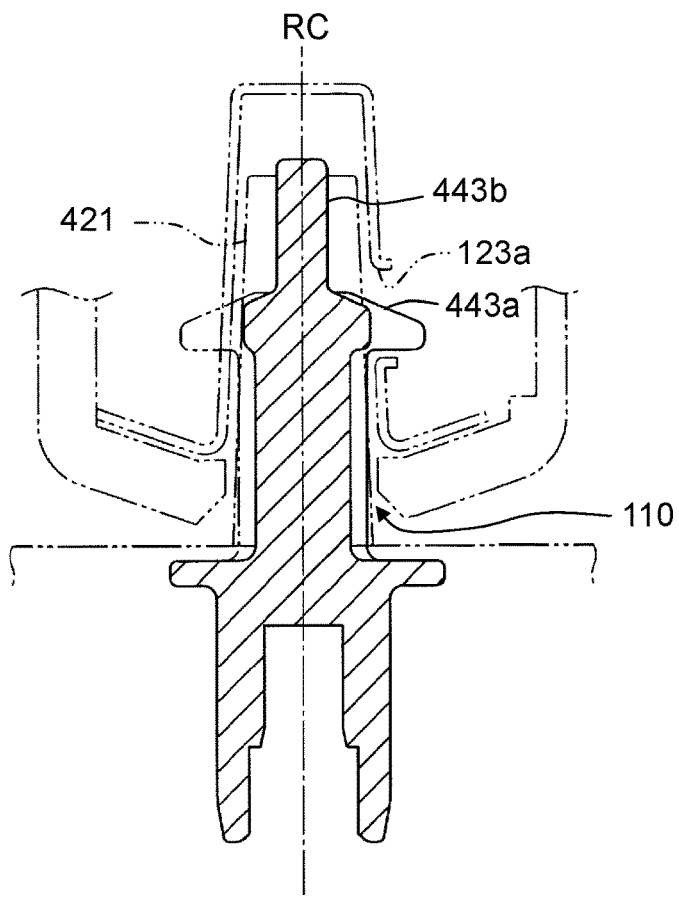
FIG. 16B is a cross-sectional view taken along line 16B-16B illustrated in FIG. 16A.

FIGS. 16A and 16B are views for describing an engagement state of a right side in the width direction of the lock mechanism, in the lock mechanism of electronic device 1 according to this exemplary embodiment. Specifically, FIG. 16A is a plan view for describing the engagement state, and FIG. 16B is a cross-sectional view taken along line 16B-16B illustrated in FIG. 16A.

As illustrated in FIGS. 15A and 15B, when operating member 420 lies at the first position, engaging shaft 443*g* of engaging member 443, which lies on the right side in the width direction, lies at the right end of groove 433*b* of coupling member 433. When engaging shaft 443*g* is moved frontward in the thickness direction due to groove 433*b*, engaging member 443 is positioned at the first rotational position. At this time, as illustrated in FIGS. 16A and 16B, engaging pieces 443*a* of engaging member 443 engage with engaging recesses 121*b* of engaging-target portion 110 of first unit 100. Therefore, first unit 100 is locked to socket 400.

From this state, when operating member 420 is moved to the second position, a state illustrated in FIGS. 17A, 17B, 18A, and 18B is achieved.

FIGS. 17A and 17B are external views of coupling member 433, operating member 420, and engaging members 443 configuring the lock mechanism of electronic device 1 according to this exemplary embodiment. Specifically, FIG. 17A is a plan view when operating member 420 lies at the second position, and engaging members 443 each lie at the second rotational position, and FIG. 17B is a perspective view.

Figure 18A:
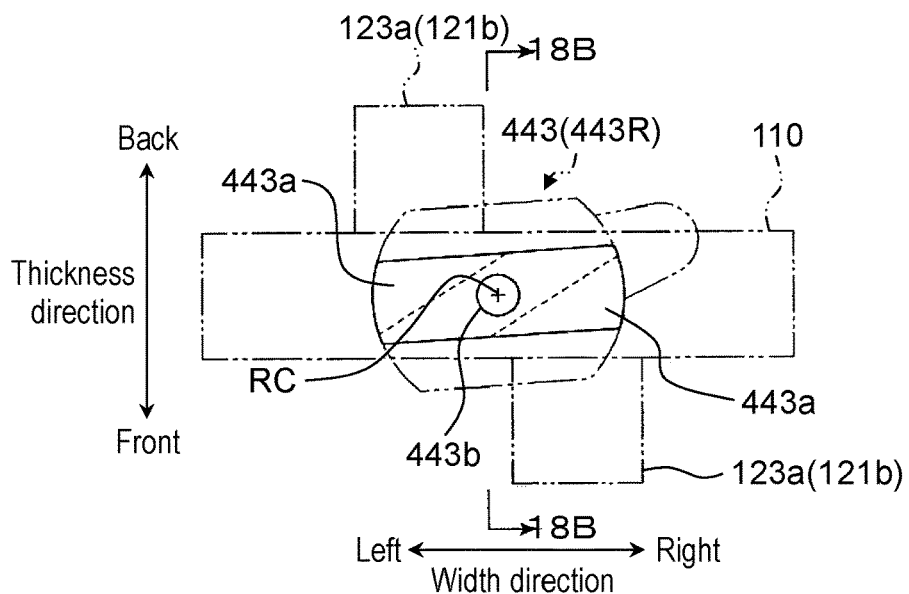
FIG. 18A is a plan view for describing a disengagement state through the lock mechanism of the electronic device according to this exemplary embodiment.
Figure 18B:
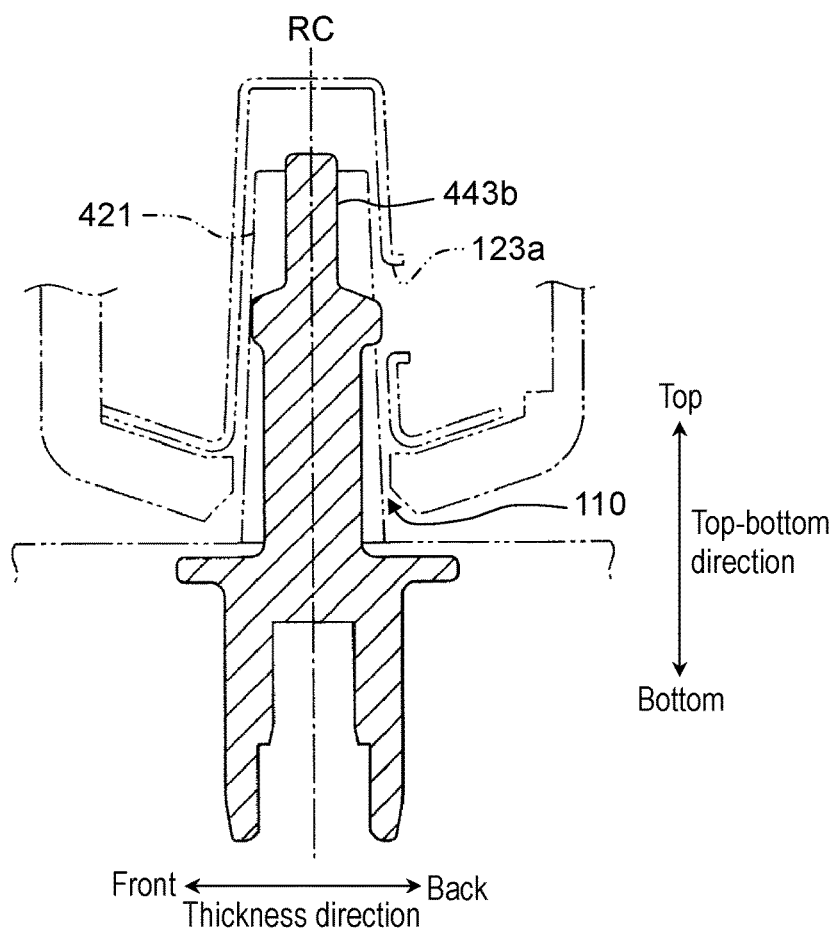
FIG. 18B is a cross-sectional view taken along line 18B-18B illustrated in FIG. 18A.

FIGS. 18A and 18B are views for describing a disengagement state of the right side in the width direction of the lock mechanism, in the lock mechanism of electronic device 1 according to this exemplary embodiment. Specifically, FIG. 18A is a plan view for describing the disengagement state, and FIG. 18B is a cross-sectional view taken along line 18B-18B illustrated in FIG. 18A.

As illustrated in FIGS. 17A and 17B, when operating member 420 lies at the second position, engaging shaft 443*g* of engaging member 443, which lies on the right side in the width direction, lies at the left end of groove 433*b* of coupling member 433. When the engaging shaft 443*g* is moved backward in the thickness direction due to groove 433*b*, engaging member 443 is positioned at the second rotational position. At this time, as illustrated in FIGS. 18A and 18B, engaging pieces 443*a* of engaging member 443 disengage from engaging recesses 121*b* of engaging-target portion 110 of first unit 100. Therefore, first unit 100 is unlocked from socket 400, and thus first unit 100 can be removed from second unit 200.

[3. Effects and Others]

[3-1. Socket Main Body]

(Details of the Present Disclosure)

In the electronic device described in Unexamined Japanese Patent Publication No. 2014-99007, when the tablet computer and the station are coupled, the tablet computer is mainly supported to the station only by engagement between a right-left pair of projections provided on right and left ends in a width direction of the station and a right-left pair of engaging-target portions provided on right and left ends in the width direction of the tablet computer. Therefore, if a force is applied from front or side to the tablet computer, the tablet computer might rattle or a supported state of the tablet computer might become unstable.

In view of the above described problems in the conventional art, the present disclosure has an object to provide an electronic device and an electronic device lock mechanism that is capable of stably supporting a first unit attached to an attachment of a second unit.

(Configuration of this Exemplary Embodiment)

Electronic device 1 according to this exemplary embodiment is an electronic device configured to include first unit 100 including display 101 and second unit 200 including an input portion so that first unit 100 and second unit 200 are detachable.

First unit 100 includes first main face 100*a* on which display 101 is disposed, and second main face 100*b* that is approximately parallel to first main face 100*a*.

Second unit 200 includes input unit 300 on which the input portion is disposed, socket 400 capable of accommodating lower side 100S (the first side) of first unit 100, and hinges 500 coupling rear side 300S (the second side) of input unit 300 and lower side 400S (the third side) of socket 400 so that input unit 300 and socket 400 are relatively rotatable.

Socket 400 includes first wall 410*a* extending, in an accommodated state where lower side 100S of first unit 100 is accommodated in socket 400, in parallel to the extending direction of lower side 100S to support the portion, near lower side 100S, of first main face 100*a*, and second wall 410*b* extending, in the accommodated state, in parallel to the extending direction of lower side 100S to support the portion, near lower side 100S, of second main face 100*b*.

On first wall 410*a* and second wall 410*b*, length L1, which extends in a direction perpendicular to the extending direction and is measured at each of support portions at the ends in the extending direction, is longer than length L2, which extends in a direction perpendicular to the extending direction and is measured at a support portion other than the ends in the extending direction.

According to this exemplary embodiment, socket 400 includes first wall 410*a* extending, in an accommodated state where lower side 100S of first unit 100 is accommodated in socket 400, in parallel to the extending direction of lower side 100S to support the portion, near lower side 100S, of first main face 100*a*, and second wall 410*b* extending, in the accommodated state, in parallel to the extending direction of lower side 100S to support the portion, near lower side 100S, of second main face 100*b*. Therefore, first unit 100 is supported by first wall 410*a* and second wall 410*b* of socket 400 with the portion, near lower side 100S, of first main face 100*a* and the portion, near lower side 100S, of second main face 100*b* being pinched between first wall 410*a* and second wall 410*b*. Further, since, on first wall 410*a* and second wall 410*b*, length L1, which extends in the direction perpendicular to the extending direction and is measured at each of the support portions at the ends in the extending direction, is longer than length L2, which extends in the direction perpendicular to the extending direction and is measured at the support portion other than the ends in the extending direction. For this reason, first unit 100 is supported at higher positions on the ends in the extending direction. Accordingly, first unit 100 accommodated in socket 400 of second unit 200 can be stably supported.

In this exemplary embodiment, socket 400 includes third wall 410c coupling one of the ends in an extending direction of first wall 410a and one of the ends in an extending direction of second wall 410b, and fourth wall 410d coupling another one of the ends in the extending direction of first wall 410a and another one of the ends in the extending direction of second wall 410b.

Therefore, socket 400 can be further strengthened. For example, first wall 410a and second wall 410b can be prevented as much as possible from collapsing in either of directions toward which first wall 410a and second wall 410b are separated from each other. Therefore, first unit 100 attached to the attachment of second unit 200 can be supported more stably.

In this exemplary embodiment, operation switches 103 (the second operating portion) and indicators 104 are disposed on the portion, near lower side 100S, of first main face 100a of first unit 100, at the portion other than the ends in the extending direction.

Therefore, even when at least either member of operation switches 103 (the second operating portion) and indicators 104 is disposed on the portion, near lower side 100S, of first main face 100a of first unit 100, at the portion other than the ends in the extending direction, first unit 100 can be supported at the ends at higher positions by first wall 410a and second wall 410b.

[3-2. Socket Operating Portion]
(Details of the Present Disclosure)

In an electronic device in which a first unit including a display and a second unit including an input portion are coupled relatively rotatably, it has been desirable that, regardless of a rotation positional relationship in which both the units are, the units are easily detachable by operating an operating member for unlocking.

To satisfy the above described demand, the present disclosure has an object to provide, in an electronic device configured to include a first unit including a display and a second unit including an input portion so that the first unit and the second unit are detachable, the electronic device including an operating member allowing easy attachment and removal.

(Configuration of this Exemplary Embodiment)

Electronic device 1 according to this exemplary embodiment is an electronic device configured to include first unit 100 including display 101 and second unit 200 including an input portion so that first unit 100 and second unit 200 are detachable.

First unit 100 includes first main face 100a on which display 101 is disposed, and second main face 100b that is approximately parallel to first main face 100a.

Second unit 200 includes input unit 300 on which the input portion is disposed, socket 400 capable of accommodating lower side 100S (the first side) of first unit 100, and hinges 500 coupling rear side 300S (the second side) of input unit 300 and lower side 400S (the third side) of socket 400 so that input unit 300 and socket 400 are relatively rotatable.

Socket 400 includes socket main body 410, and operating member 420 for performing a releasing operation of engagement through the lock mechanism for detachably locking first unit 100 and second unit 200.

Socket main body 410 includes first wall 410a lying in parallel to first main face 100a in an accommodated state where lower side 100S (the first side) of first unit 100 is accommodated in socket 400, and second wall 410b lying in parallel to second main face 100b in the accommodated state.

Operating member 420 includes first operating portion 420a disposed on an exterior of first wall 410a, and second operating portion 420b disposed on an exterior of second wall 410b.

According to this exemplary embodiment, a user can perform an operation from either of main faces of first unit 100.

For example, when first unit 100 is open with respect to second unit 200, and electronic device 1 is operated, a user can operate first operating portion 420a from first main face 100a provided with display 101 toward which the user faces. When first unit 100 is closed with respect to second unit 200, first operating portion 420a on first main face 100a cannot be operated from first main face 100a, but second operating portion 420b on second main face 100b can be operated from second main face 100b.

In this exemplary embodiment, socket main body 410 has an approximately U-shaped cross section so as to accommodate lower side 100S of first unit 100.

Operating member 420 has an approximately U-shaped cross section so as to be slidable, on the exterior of socket main body 410, in the extending direction of socket 400.

According to this exemplary embodiment, since socket main body 410 and operating member 420 have each been formed in the approximately U-shaped cross section, the internal space of socket main body 410 can be effectively used, and a variety of members, mechanisms, and other components can be disposed.

In this exemplary embodiment, the internal space of socket main body 410 accommodates drive mechanism 430 for performing a releasing operation of engagement through the lock mechanism when operating member 420 is slid toward a predetermined side in the extending direction of socket main body 410.

According to this exemplary embodiment, the internal space of socket main body 410 can be effectively used to accommodate drive mechanism 430 for performing a releasing operation of engagement through the lock mechanism.

[3-3. Lock Mechanism]
(Details of the Present Disclosure)

A conventional engaging portion on a second unit of an electronic device might be sometimes a hook, which engages with an engaging-target portion of a first unit when being moved toward a side in a width direction of the second unit, and disengages from the engaging-target portion of first unit when being moved toward the other side in the width direction of the second unit. Therefore, for example, a force applied to the first unit and/or the second unit so as to move the first unit to the other side described above could lead to an unstable engagement state. In addition, a plate hook that is perpendicular to a depth direction of the second unit might be sometimes used. This case has been problematic because a force applied to the first unit in the depth direction could cause the first unit to become unstable.

In view of the above described problems in the conventional art, the present disclosure has an object to provide a lock mechanism and an electronic device each capable of stably keeping a second unit and a first unit coupled each other.

(Configuration of this Exemplary Embodiment)

In electronic device 1 configured to include first unit 100 and second unit 200 so that first unit 100 and second unit 200 are detachable, a lock mechanism according to this exemplary embodiment can lock first unit 100 and second unit 200 coupled each other.

The lock mechanism includes engaging members 443 provided to second unit 200 to respectively project externally from the top faces (the predetermined face of the second unit) of circuit board units 431*a* of second unit 200 so as to be turnable about rotation shaft center RC perpendicular to the top faces of circuit board units 431*a*, and operating member 420 provided to second unit 200 so as to be linearly movable between a first position and a second position. Also included are engaging-target portions 110 that are provided on lower side 100S of first unit 100, and that are formed to, when first unit 100 and second unit 200 are coupled each other, engage with engaging members 443 when engaging members 443 are each lie at a first rotational position, and disengage from engaging members 443 when engaging members 443 each lie at a second rotational position. Further included is drive mechanism 430 for translating a linear movement of operating member 420 between the first position and the second position into a rotation of each of engaging members 443 between the first rotational position and the second rotational position so that, when operating member 420 is moved to the first position, engaging members 443 are each rotated to the first rotational position, and, when operating member 420 is moved to the second position, engaging members 443 are each rotated to the second rotational position.

Engaging members 443 each include a pair of engaging pieces 443*a* around rotation shaft center RC.

Engaging-target portions 110 each include a pair of engaging recesses 121*b* with which the pair of engaging pieces 443*a* engages when engaging members 443 each lie at the first rotational position, and from which the pair of engaging pieces 443*a* disengages when engaging members 443 each lie at the second rotational position.

According to this exemplary embodiment, by using operating member 420, engaging members 443 each can be rotated about rotation shaft center RC, and the pair of engaging pieces 443*a* provided around rotation shaft center RC can be engaged with the pair of engaging recesses 121*b* of each of engaging-target portions 110. As described above, this exemplary embodiment has employed a structure for causing the pair of engaging pieces 443*a* provided around rotation shaft center RC in each of engaging members 443 to rotate and to engage with the pair of engaging recesses 121*b* of each of engaging-target portions 110. Therefore, even when, while engaging pieces 443*a* and engaging recesses 121*b* are engaged with each other, a force is applied to first unit 100 in one of a front-back direction, a right-left direction, and a top-bottom direction, and engaging pieces 443*a* and engaging recesses 121*b* relatively move, and, as a result, strength in engagement between one of engaging pieces 443*a* and one of engaging recesses 121*b* is decreased, strength in engagement between another of engaging pieces 443*a* and another of engaging recesses 121*b* can be increased. In other words, even when a force is applied to first unit 100 in one of a front-back direction, a right-left direction, and a top-bottom direction, strength in engagement in the lock mechanism is kept almost constant as a whole. Accordingly, even when a force is applied to first unit 100 in any directions, a stable engagement state can be achieved.

In this exemplary embodiment, drive mechanism 430 includes engaging shaft 443*g* that is provided at a position which differs in a radial direction from rotation shaft center RC on each of engaging members 443, and that extends in parallel to rotation shaft center RC, and coupling member 433 that is fixed to operating member 420, that is supported by socket main body 410 (a predetermined housing) of second unit 200 so as to be movable in a moving direction of operating member 420, and that includes groove 433*a* (433*b*) relatively movably engaged with engaging shaft 443*g* of each of engaging members 443.

Groove 433*a* (433*b*) is formed meanderingly so that, when operating member 420 is moved to the first position, one of engaging members 443 is rotated about rotation shaft center RC to the first rotational position, and, when operating member 420 is moved to the second position, the one of engaging members 443 is rotated about rotation shaft center RC to the second rotational position.

Therefore, with a simple structure, a linear movement of operating member 420 can be translated into a rotation movement of each of engaging members 443.

In this exemplary embodiment, a plurality of engaging members 443 and a plurality of engaging-target portions 110 are provided.

Drive mechanism 430 translates a linear movement of operating member 420 between the first position and the second position into a rotation of each of engaging members 443 between the first rotational position and the second rotational position.

Therefore, a first unit 100 and second unit 200 can be engaged at a plurality of locations, and thus a stable engagement state can be achieved. Further, an operation of single operating member 420 can drive two or more engaging members 443.

In this exemplary embodiment, second unit 200 includes input unit 300 including keyboard 301, socket 400 capable of accommodating lower side 100S of first unit 100, and hinges 500. Hinges 500 couple rear side 300S (the second side) of input unit 300 and lower side 400S (the third side) of socket 400 so that input unit 300 and socket 400 are relatively rotatable.

The top faces of circuit board units 431*a* of second unit 200 (the predetermined face of the second unit) are faces facing lower side 100S of first unit 100 in socket 400 when lower side 100S of first unit 100 is accommodated in socket 400.

Therefore, first unit 100 and second unit 200 become are relatively rotatable, and thus, in such electronic device 1, the above described effects can be achieved.

In this exemplary embodiment, the internal space of socket 400 accommodates drive mechanism 430. Therefore, effective use of the internal space of socket 400 enables disposition of drive mechanism 430.

In this exemplary embodiment, first unit 100 is a tablet computer.

For an increase in efficiency of text entry and other purposes, such a tablet computer is often required to be detachable with respect to input unit 300 including a keyboard and other input devices. A tablet computer might sometimes become heavy due to a central processing unit (CPU), a volatile storage device (RAM), a non-volatile storage device (e.g., ROM and SSD), a battery, and other devices incorporated in the tablet computer. According to this exemplary embodiment, even when first unit 100 is a tablet computer, a lock mechanism capable of securely locking first unit 100 can be provided, and a stable engagement state can be achieved with the lock mechanism for locking the tablet computer.

Another Exemplary Embodiment

The first exemplary embodiment has been described above and exemplified as the technique of the present disclosure. However, the technique of the present disclosure is not limited to the above described first exemplary embodiment, but is applicable to another exemplary embodiment where an amendment, a replacement, an addition, or an omission has been made appropriately.

Another exemplary embodiment will be described herein.

In the first exemplary embodiment, second unit 200 has included input unit 300, socket 400, and hinges 500. However, the second unit is not limited to such a configuration. For example, the technique of the present disclosure is applicable to a configuration where a second unit without including a hinge and a socket. Specifically, a second unit is an input unit including a keyboard, and the input unit includes a receiver that is provided on a main face on which the keyboard is disposed, and that can accept lower side 100S of first unit 100.

A predetermined face of the second unit may be a face facing lower side 100S of first unit 100 on the receiver when lower side 100S of first unit 100 is mounted on the receiver, such as a top face of the second unit (the main face on which an input portion such as the keyboard is disposed). In this case, an internal space of an input unit may accommodate a drive mechanism.

The exemplary embodiments have been described above and exemplified as the technique of the present disclosure. Appended drawings and detailed descriptions have also been provided.

Accordingly, the components described in the appended drawings and the detailed descriptions include, in order to exemplify the above described technique, not only essential components but also components that are not essential. Therefore, it should not be immediately construed that these components that are not essential are essential even if the components are described in the appended drawings and the detailed descriptions.

Since the above described exemplary embodiments are for exemplifying the technique of the present disclosure, various modifications, replacements, additions, and omissions can be made within the scope of the appended claims or of their equivalents.

The present disclosure can be widely used in an electronic device configured to include a first unit and a second unit so that the first unit and the second unit are detachable.

What is claimed is:

1. An electronic device comprising:
a first unit including a display; and
a second unit including an input portion, the first unit and the second unit being configured to be detachable, wherein
the first unit includes a first main face and a second main face, the display being disposed on the first main face, the second main face being substantially parallel to the first main face,
the second unit includes
an input unit, the input portion being disposed on the input unit,
a socket capable of accommodating a first side of the first unit, and
a hinge coupling a second side of the input unit and a third side of the socket so that the input unit and the socket are relatively rotatable,
the socket includes
a socket main body, and
an operating member for performing an operation of releasing engagement through a lock mechanism for detachably locking the first unit and the second unit,
the socket main body includes
a first wall lying in parallel to the first main face, and on the first main face side of the first unit, in an accommodated state where the first side of the first unit is accommodated in the socket, and
a second wall lying in parallel to the second main face, and on the second main face side of the first unit, in the accommodated state, and
the operating member includes
a first operating portion disposed on an exterior of the first wall, and
a second operating portion disposed on an exterior of the second wall, and
each of the first operating portion and the second operating portion is independently capable of causing the operating member to perform the operation of releasing engagement.

2. The electronic device according to claim 1, wherein
the socket main body is formed in an approximately U-shaped cross section so as to be capable of accommodating the first side of the first unit, and
the operating member is formed in an approximately U-shaped cross section so as to be slidable on the exterior of the socket main body in an extending direction of the socket main body, with the first and second operating portions being present on legs of the U-shape.

3. The electronic device according to claim 2, wherein
a drive mechanism for performing an operation of releasing engagement through the lock mechanism when the operating member is slid toward a predetermined side in the extending direction of the socket main body is accommodated in an internal space of the socket main body.

* * * * *